(12) United States Patent
Carlei

(10) Patent No.: US 10,883,281 B2
(45) Date of Patent: Jan. 5, 2021

(54) DEVICE FOR USE IN LIFTING, TRANSPORTING AND INSTALLING SHEET MATERIAL

(71) Applicant: Quantum Workhealth Programmes Pty Ltd, Essendon (AU)

(72) Inventor: Ricardo Carlei, Essendon (AU)

(73) Assignee: Quantum Workhealth Programmes Pty Ltd, Essendon (AU)

( * ) Notice: Subject to any disclaimer, the term of this patent is extended or adjusted under 35 U.S.C. 154(b) by 0 days.

(21) Appl. No.: 16/566,203

(22) Filed: Sep. 10, 2019

(65) Prior Publication Data

US 2020/0079598 A1 Mar. 12, 2020

(30) Foreign Application Priority Data

Sep. 11, 2018 (AU) ................................ 2018903412

(51) Int. Cl.
*E04F 21/18* (2006.01)
*B62B 3/04* (2006.01)
(Continued)

(52) U.S. Cl.
CPC ............ *E04F 21/1872* (2013.01); *B62B 3/04* (2013.01); *B62B 3/108* (2013.01); *B65G 49/061* (2013.01); *E04F 21/1844* (2013.01)

(58) Field of Classification Search
CPC ............... E04F 21/1822; E04F 21/1811; E04F 21/1816; E04F 21/1805; E04F 21/1894;
(Continued)

(56) References Cited

U.S. PATENT DOCUMENTS

| 2,411,263 A | * | 11/1946 | Guerin | .................... B66F 9/125 |
| | | | | 414/641 |
| 2,828,870 A | * | 4/1958 | Corley | .................... B66C 13/18 |
| | | | | 414/11 |

(Continued)

FOREIGN PATENT DOCUMENTS

| GB | 1072679 A | 6/1967 |
| GR | 1005480 B | 3/2007 |

(Continued)

*Primary Examiner* — Gregory W Adams
(74) *Attorney, Agent, or Firm* — Harness, Dickey & Pierce, P.L.C.

(57) ABSTRACT

A device for use in lifting, transporting and installing sheet material has a base, wheels on which the base is supported, a mast that extends upwardly from the base, a carriage that is in engagement with the mast, a supporting head that is mounted to the carriage, and a lifting mechanism to provide support to the carriage in the longitudinal direction of the mast. The wheels include rear wheels that are connected to the rear of the base in a manner that permits steering of the device during movement across a surface, and a front wheel set that is connected to the front of the base. The front wheel set includes a wheel to each side of the device, and the wheels of the front wheel set are rotatable about a common axis. The connection of the mast to the base is such that the mast is rotatable relative to the base about a rotational axis. The device further has an actuator that is operable to change the angular position of the mast relative to the base. The supporting head is configured to support sheet material above the surface.

18 Claims, 27 Drawing Sheets

Figure 1:
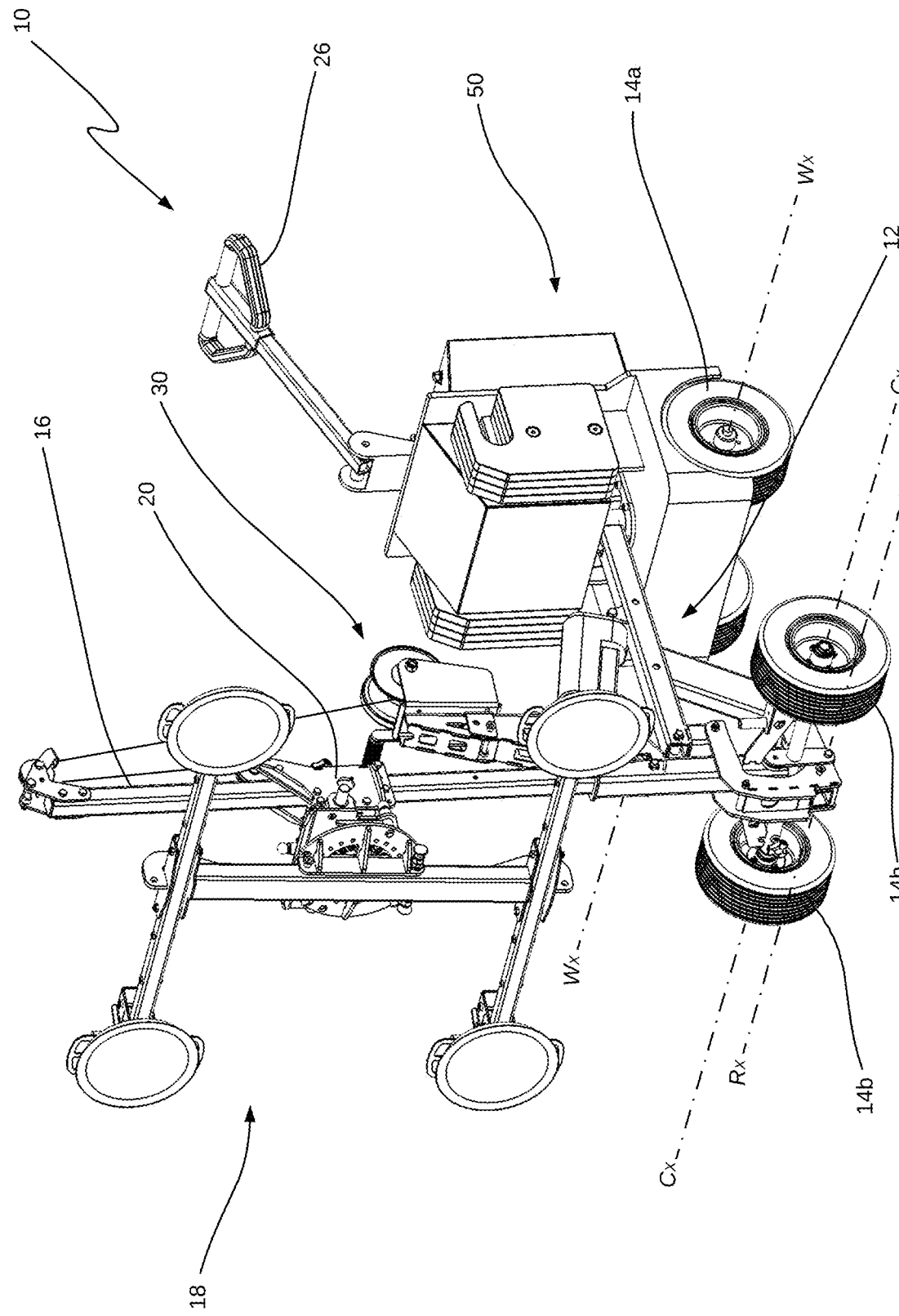

(51) Int. Cl.
 *B65G 49/06* (2006.01)
 *B62B 3/10* (2006.01)

(58) Field of Classification Search
 CPC ... E04F 21/0023; E04F 21/18; E04F 21/1888; E04G 21/167; E04G 21/168; B62B 3/108; B62B 1/268; B62B 2203/10; B62B 5/0083; Y10S 269/905; Y10S 269/904; B65G 49/061; B62D 13/04; B62D 13/025
 See application file for complete search history.

(56) References Cited

U.S. PATENT DOCUMENTS

| | | | | |
|---|---|---|---|---|
| 3,342,282 A * | 9/1967 | Forpahl | ............... | E02F 9/0841 180/235 |
| 3,361,280 A * | 1/1968 | Traver | ............... | B66F 9/181 414/627 |
| 3,540,753 A * | 11/1970 | Hanson | ............... | E04G 21/16 280/47.34 |
| 3,977,534 A * | 8/1976 | Blake | ............... | E04F 21/1894 414/11 |
| 4,135,592 A * | 1/1979 | Wincent | ............... | B62D 53/02 180/19.2 |
| 4,192,626 A * | 3/1980 | Wyckoff | ............... | E01C 19/262 172/256 |
| 4,285,626 A * | 8/1981 | Donato | ............... | B66F 9/18 414/622 |
| 4,969,789 A * | 11/1990 | Searle | ............... | B66C 1/24 414/10 |
| 6,352,130 B2 * | 3/2002 | Klein | ............... | B64F 1/22 180/19.3 |
| 6,517,097 B1 * | 2/2003 | Stark | ............... | B62D 13/02 111/14 |
| 7,597,522 B2 * | 10/2009 | Borntrager | ............... | B66F 9/065 414/347 |
| 7,918,294 B2 * | 4/2011 | Smith | ............... | B62D 49/007 180/19.1 |
| 8,083,458 B2 * | 12/2011 | Wilkie | ............... | B66F 9/06 212/195 |
| 9,085,313 B2 * | 7/2015 | Mojeski | ............... | B62B 3/10 212/195 |
| 9,623,891 B2 * | 4/2017 | Newell | ............... | B62B 5/0033 |
| 9,668,429 B2 * | 6/2017 | Dixon | ............... | B60P 3/41 |
| 2008/0273953 A1 * | 11/2008 | Bodem | ............... | E04G 21/16 414/382 |

FOREIGN PATENT DOCUMENTS

| | | |
|---|---|---|
| WO | WO-2015161349 A1 | 10/2015 |
| WO | WO-2018107232 A1 | 6/2018 |

* cited by examiner

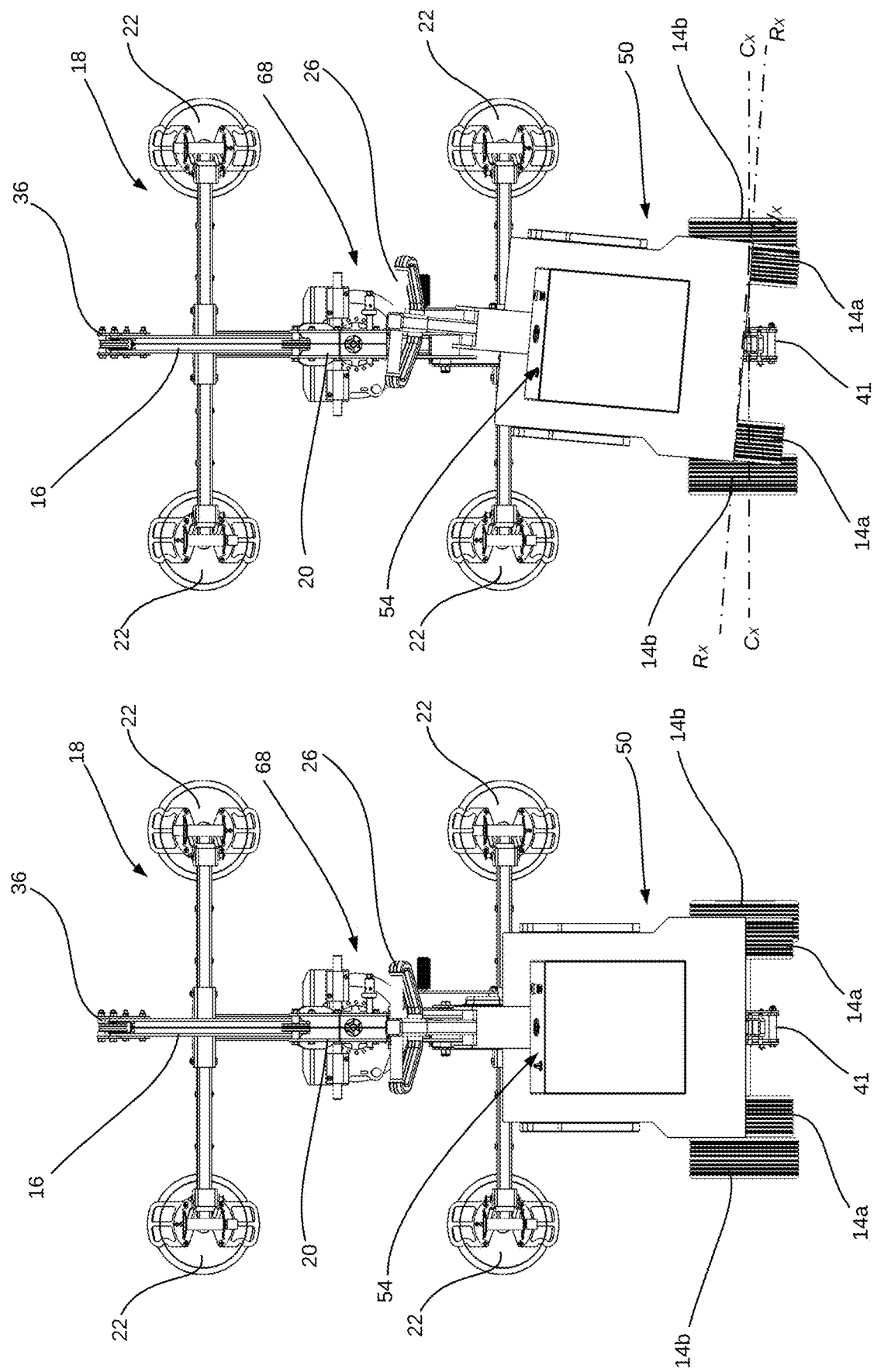

DEVICE FOR USE IN LIFTING, TRANSPORTING AND INSTALLING SHEET MATERIAL

CROSS-REFERENCE TO RELATED APPLICATION

This application claims the benefit and priority of Australian Application No. 2018903412 filed Sep. 11, 2018. The entire disclosure of the above application is incorporated herein by reference.

FIELD

The present disclosure relates to a device for use in lifting, transporting and installing sheet material.

BACKGROUND

This section provides background information related to the present disclosure which is not necessarily prior art.

Sheet materials can be difficult to handle, particularly in respect of larger sheets and/or sheets made of materials with a high density, which can be particularly heavy. Sheet materials include glass panes, insulated glass units ("IGUs"), framed windows/IGUs, plasterboard, timber boards (including engineered timber materials), doors, fibre cement sheet, and the like. Current architectural trends favour large, uninterrupted glazing that has a low thermal conductivity. Consequently, large and heavy individual glass sheets, and IGUs are commonly used in new buildings and in renovations.

Manual handling of sheet materials is undesirable for health and safety reasons. To limit the manual lifting of sheet materials for transportation and installation, it is known to use devices, such as motorized and hand-operated trolleys/carts. In the glazing industry, these devices can reduce the number of people required to lift, transport and install glass panes, etc. Hand-operated devices have the advantage of being light weight, and can enable a single user at a job site to transport and install glass panes with a mass in excess of 100 kg, and/or have a long edge that is in excess of 3 m.

Installation of sheet material, such as glass panes and IGUs, can require transportation of the material from a vehicle or a store, to the installation location. Once at the installation location, there can be need for relatively fine movement of the sheet material (sometimes with millimetre precision) to position the sheet material in the ultimate position within a frame or mount. By way of example, glass sheet that is installed in a floor-to-ceiling application is "oversize" relative to the opening, because the supporting frame structures are concealed by the floor and ceiling. The glass sheet is installed by positioning one edge in the frame, and then slowly and carefully manipulating the glass sheet fully into the frame. Stability of a glass sheet during transport to the installation location is important for the safety of the operator/installer, and for minimizing the likelihood of damage to property, including the glass sheet.

There is a need to address the above, and/or at least provide a useful alternative.

SUMMARY

This section provides a general summary of the disclosure, and is not a comprehensive disclosure of its full scope or all of its features.

There is provided a device for use in lifting, transporting and installing sheet material, the device comprising:
  a base;
  wheels on which the base is supported, such that the base is movable across a surface on the wheels, the wheels including:
    one or more rear wheels that are connected to the rear of the base in a manner that permits steering of the device during movement across the surface, and a front wheel set that is connected to the front of the base, the front wheel set including a wheel to each side of the device, the wheels of the front wheel set being rotatable about a common axis;
  a mast that extends upwardly from the base, and is connected to the base such that the mast is rotatable relative to the base about a rotational axis, the rotational axis being parallel to the common axis;
  a carriage that is in engagement with the mast so that carriage is movable along at least a traversable portion of the mast and is guided by the mast;
  a supporting head that is mounted to the carriage, and is configured to support sheet material above the surface;
  a lifting mechanism to provide support to the carriage in the longitudinal direction of the mast; and
  an actuator that is operable to change the angular position of the mast relative to the base.

Preferably, the actuator is operable to rotate the mast to a forward angular position relative to the base in which the upper end of the mast is forward of the rotational axis. Alternatively or additionally, the actuator is operable to rotate the mast to the forward angular position relative to the base in which the upper end of the mast is forward of the front wheels.

Preferably, the actuator is operable to rotate the mast to a rearward angular position relative to the base in which the upper end of the mast is rearward of the rotational axis. Alternatively or additionally, the actuator is operable to rotate the mast to the forward angular position relative to the base in which the upper end of the mast is forward of the front wheels.

In some embodiments, when the mast is in the forward angular position the bottom of the traversable portion of the mast is forward of the rotational axis. In some embodiments, when the mast is in the rearward angular position the bottom of the traversable portion of the mast is rearward of the rotational axis.

In at least some embodiments, the device has a forward limit stop to limit the angular position of the mast relative to the base to the forwardmost angular position. In some embodiments, when the mast is in the forward angular position, the bottom of the traversable portion of the mast is forward of the forward limit stop.

Alternatively or additionally, the device has a rearward limit stop to limit the angular position of the mast relative to the base to the rearmost angular position. In some embodiments, when the mast is in the rearmost angular position the bottom of the traversable portion of the mast is rearward of the rearward limit stop.

Preferably, the forward and/or rearward limit stops provide a physical barrier to rotation.

The device can include component parts and/or weights that are disposed over and/or rearward of the rear wheels, whereby, when:
  the mast is in its forwardmost angular position,
  the carriage is at the top of the traversable portion of the mast, and a predetermined mass is supported on the supporting head, the centre of mass of the device and the predetermined mass is rearward of the front wheel set.

Preferably, the device includes a handle for a user to grasp when moving the device across a surface, wherein the handle is disposed over and/or rearward of the rear wheels. In at least some embodiments, the handle is rotatable with the rear wheels.

Preferably, the device further comprises one or more mounts at the rear of the device, whereby weights are mountable onto the mounts to provide additional mass to counterbalance sheet material that is supported on the supporting head. Preferably, each mount has a weight retaining member that inhibits removal of weights from the respective mount.

In certain embodiments, the device includes one or more drive motors that are arranged to drive at least one wheel of the device. Preferably, the drive motors are disposed in the rear portion of the device, and are arranged to drive the rear wheels of the device. Preferably, the device includes a battery to provide electrical power to the drive motors. In some embodiments, the rear portion of the device includes a housing, wherein the battery, drive motors and an electrical circuit that interconnects the battery and drive motors are contained within the housing.

In embodiments in which the device includes a battery, the actuator can be an electromechanical actuator that is powered by the battery. In at least some embodiments, the actuator is a linear actuator.

The device can further comprise an articulated coupling between the front and rear wheels that enables the rotational axis of the rear wheels to rotate within a general horizontal plane and about an articulation axis relative to the front wheels to thereby steer the device. Preferably, the articulation axis is transverse to the rotational axis of the rear wheels. In certain embodiments, the articulation axis of the articulated coupling intersects the rotational axis of the rear wheels.

In some embodiments, the base comprises a frame with a linkage that extends between the front and rear portions of the device, whereby the length of the linkage is adjustable to thereby adjust the wheelbase of the device. Preferably, the articulated coupling is disposed at the rear of the frame.

In embodiments in which the device includes drive motors that are arranged to drive the rear wheels of the device, and the device comprises a rear drive unit that is connected to the frame by the articulated coupling. In such embodiments, the mounts for the weights are preferably part of the rear drive unit.

The frame can further comprise a swivel that enables the articulation axis to rotate relative to the common axis of the front wheels. Preferably, the device has swivel limit stops that restrict the rotational range of the articulation axis. In some embodiments, the swivel limit stops restrict the rotational range to 45°. Preferably, the swivel limit stops restrict the rotational range to approximately 10°.

In some embodiments, the base includes a pivot section that is pivotally connected to the frame, the pivot section including a mast step to which the mast is connected, and wherein the actuator is a linear actuator that is connected at one end to the frame, and at the opposing end to the pivot section.

Preferably, the device is arranged with the lifting mechanism connected to the base so as to rotate with the mast about the rotational axis. In embodiments in which the front of the base includes the pivot section, the pivot section can include an arm on which a winch of the lifting mechanism is connectable or is connected. The arm can have a lower end that is connected to the mast step.

The device can comprise at least one axle on which the front wheels are mounted. In some embodiments, the front wheels are connected to the pivot section so that the common axis is rotatable so as to rotate with the mast about the rotational axis.

In some alternative embodiments, the actuator is a linear actuator that extends between the frame, and the mast.

In certain embodiments, the actuator includes a screw shaft that is rotatable to rotate the mast, a fixed nut that is connected to the base, and a drive input that is rotationally fixed to the screw shaft, whereby a user can rotate the drive input to cause the threaded shaft to rotate. In one form the drive input can be a socket to which a tool is attachable. In some alternative forms the drive input can be manually rotatable, and is one or more of: a knob, a wheel and a handle, that is secured to the threaded shaft.

In some embodiments, the supporting head has two spaced apart support subassemblies that are interconnected by a cross bar; and the device further comprises a coupling assembly that couples the supporting head to the carriage, wherein the coupling assembly includes a cross bar mounting portion, and two spaced apart connectors that include a first connector and a second connector, wherein the first connector connects the cross bar to the cross bar mounting portion such that the cross bar is rotatable about the first connector between a first position and one or more second positions, and wherein the second connector is configured to releasably connect the cross bar to the cross bar mounting portion, whereby, when the supporting head is in the first position relative to the cross bar mounting portion, the second connector can be arranged to prevent the cross bar rotating about the first connector out of the first position.

There is also provided a device for use in lifting, transporting and installing sheet material, the device comprising:

a base;

wheels on which the base is supported, such that the base is movable across a surface on the wheels, the wheels including:

one or more rear wheels that are connected to the rear of the base in a manner that permits steering of the device during movement across the surface, and a front wheel set that is connected to the front of the base, the front wheel set including a wheel to each side of the device, the wheels of the front wheel set being rotatable about a common axis;

a mast that extends upwardly from the base;

a carriage that is in engagement with the mast so that carriage is movable along at least a traversable portion of the mast and is guided by the mast;

a lifting mechanism to provide support to the carriage in the longitudinal direction of the mast a supporting head that is configured to support sheet material above the surface, the supporting head has two spaced apart support subassemblies that are interconnected by a cross bar;

a coupling assembly that couples the supporting head to the carriage, the coupling assembly having a cross bar mounting portion, and two spaced apart connectors that include a first connector and a second connector, wherein the first connector connects the cross bar to the cross bar mounting portion such that the supporting head is rotatable about the first connector between a first position and one or more second positions, and wherein the second connector is configured to releasably connect the cross bar to the cross bar mounting portion, whereby, when the supporting head is in the first position relative to the cross bar mounting portion, the second connector can be arranged to prevent the cross bar rotating about the first connector out of the first position.

Thus, the second connector can release the supporting head such that the supporting head can rotate on the first connector.

Preferably, the second connector includes one or more spring-biased pins that are mounted on the cross bar mounting portion, and are arranged with a shaft that is to project through aligned apertures in the cross bar and cross bar mounting portion when the supporting head is in the first position.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 2:
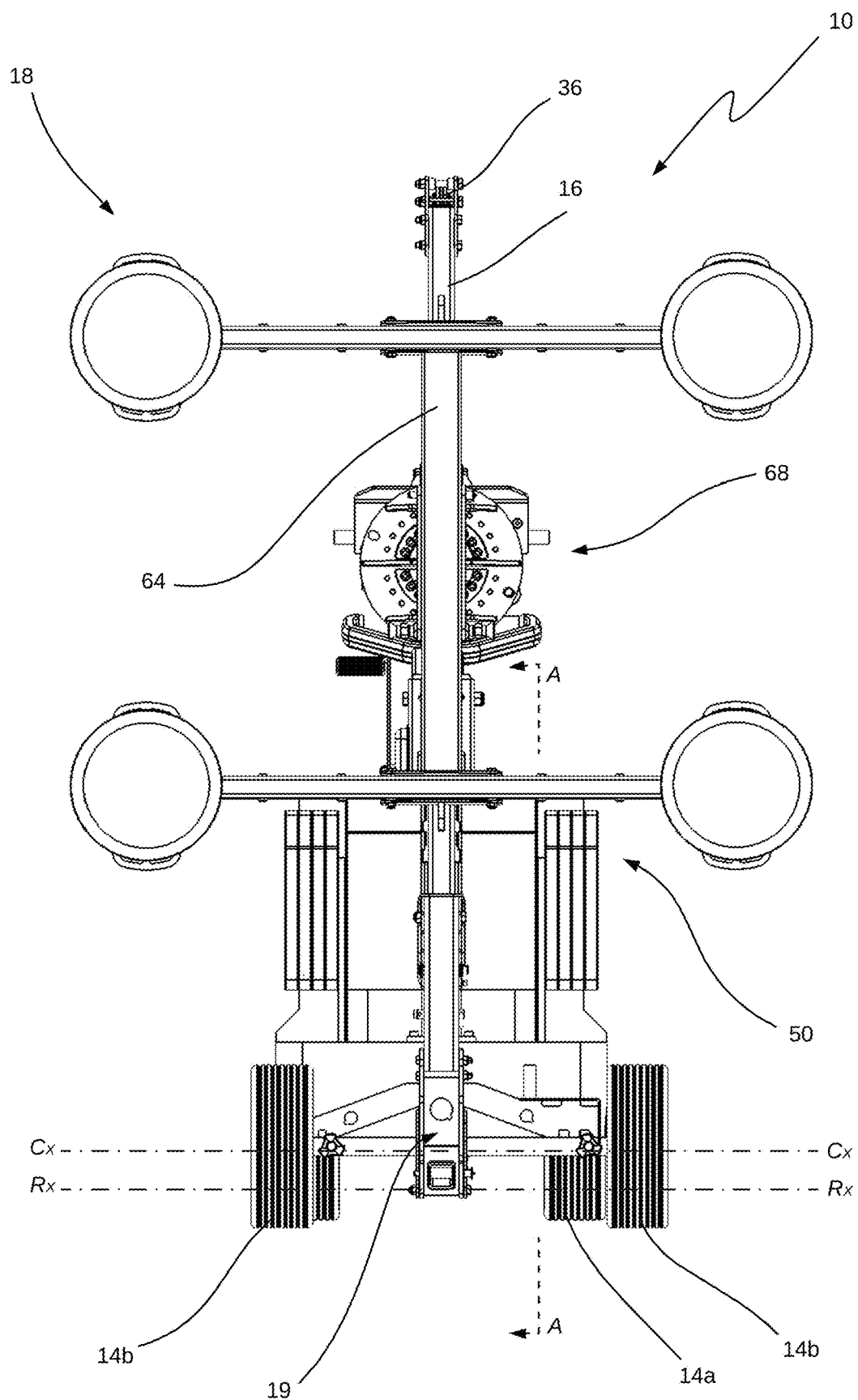
Figure 3:
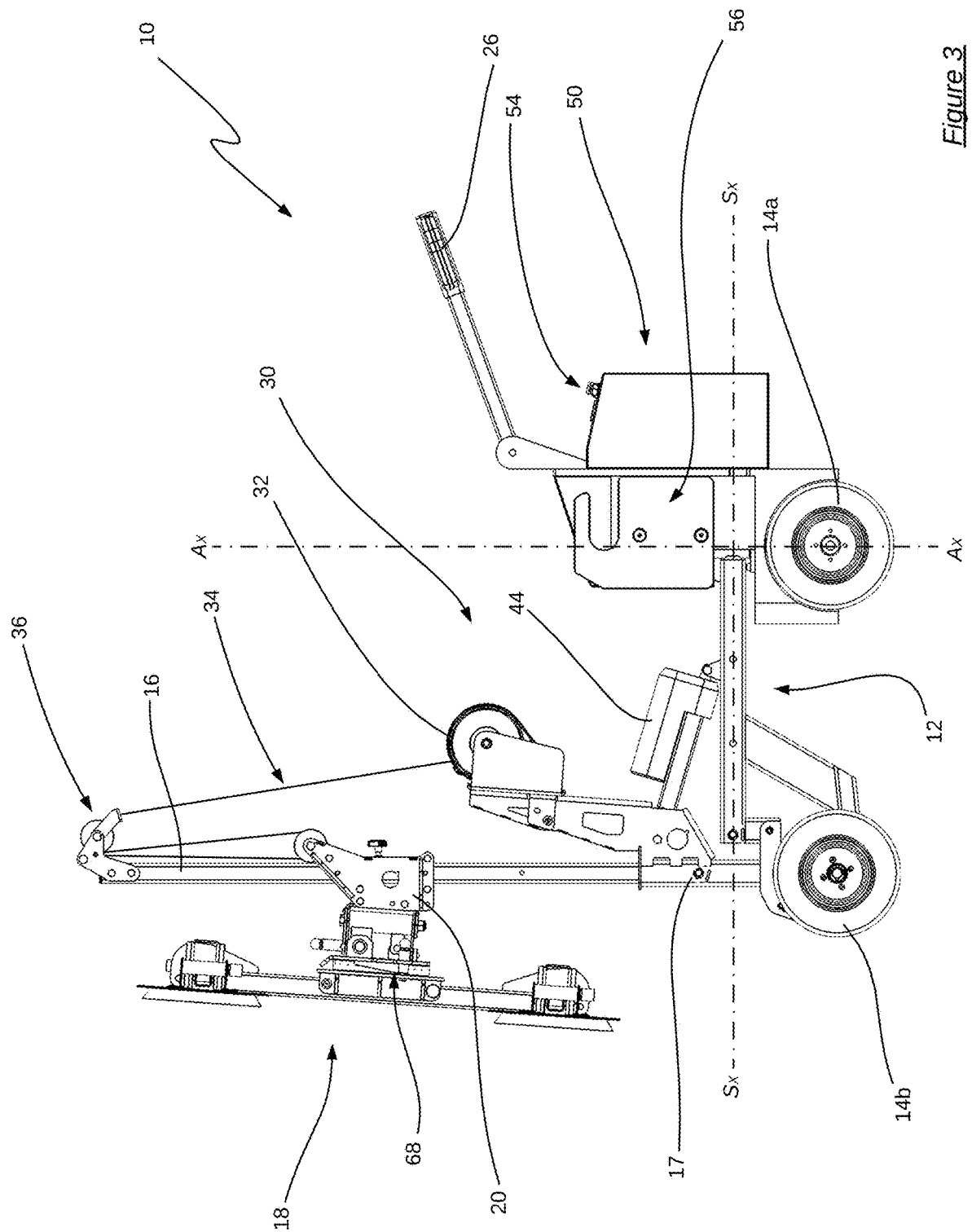
Figure 4:
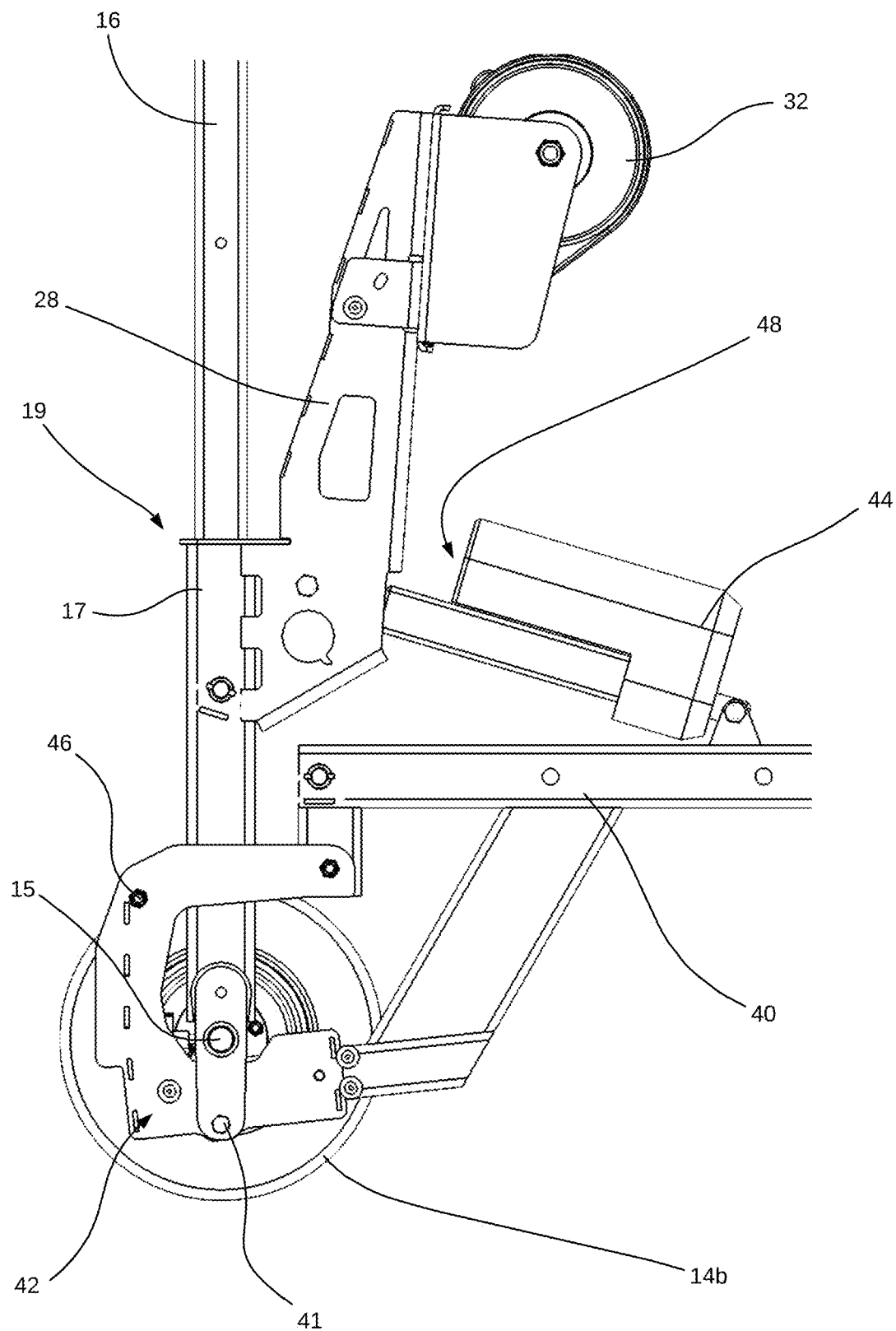
Figure 5:
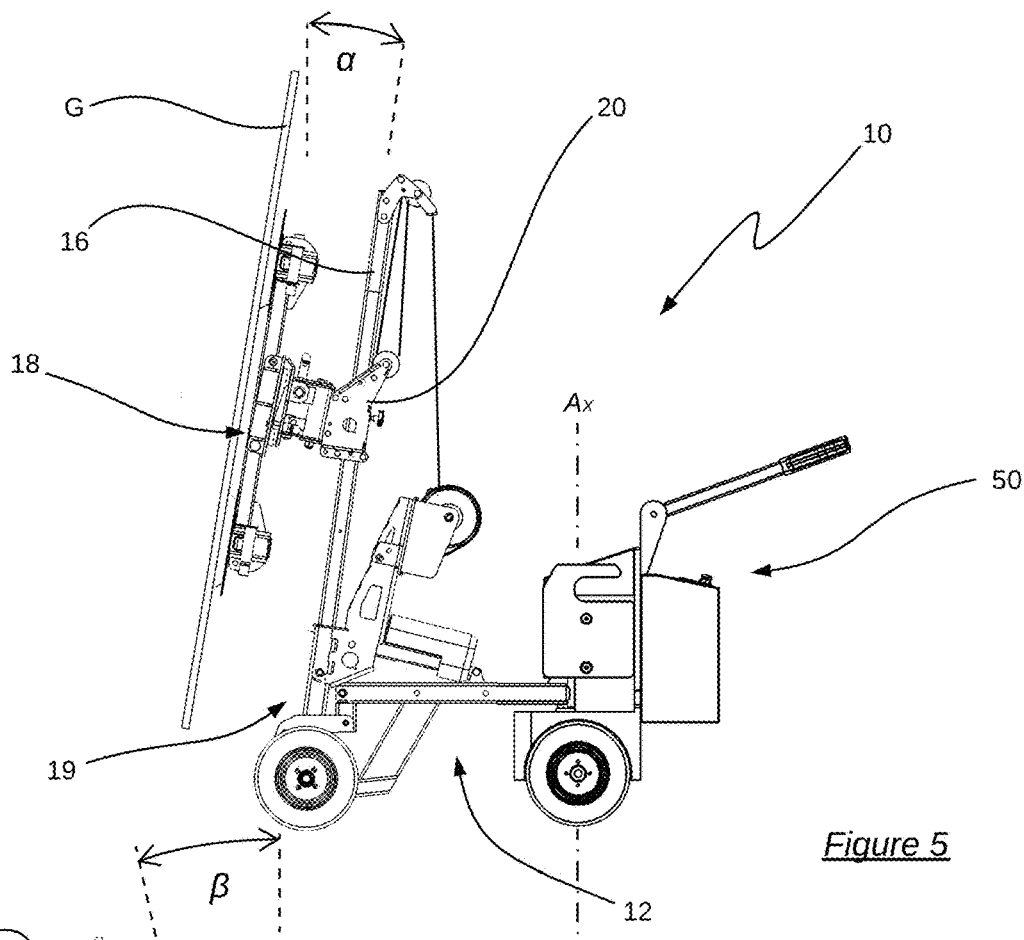
Figure 6:
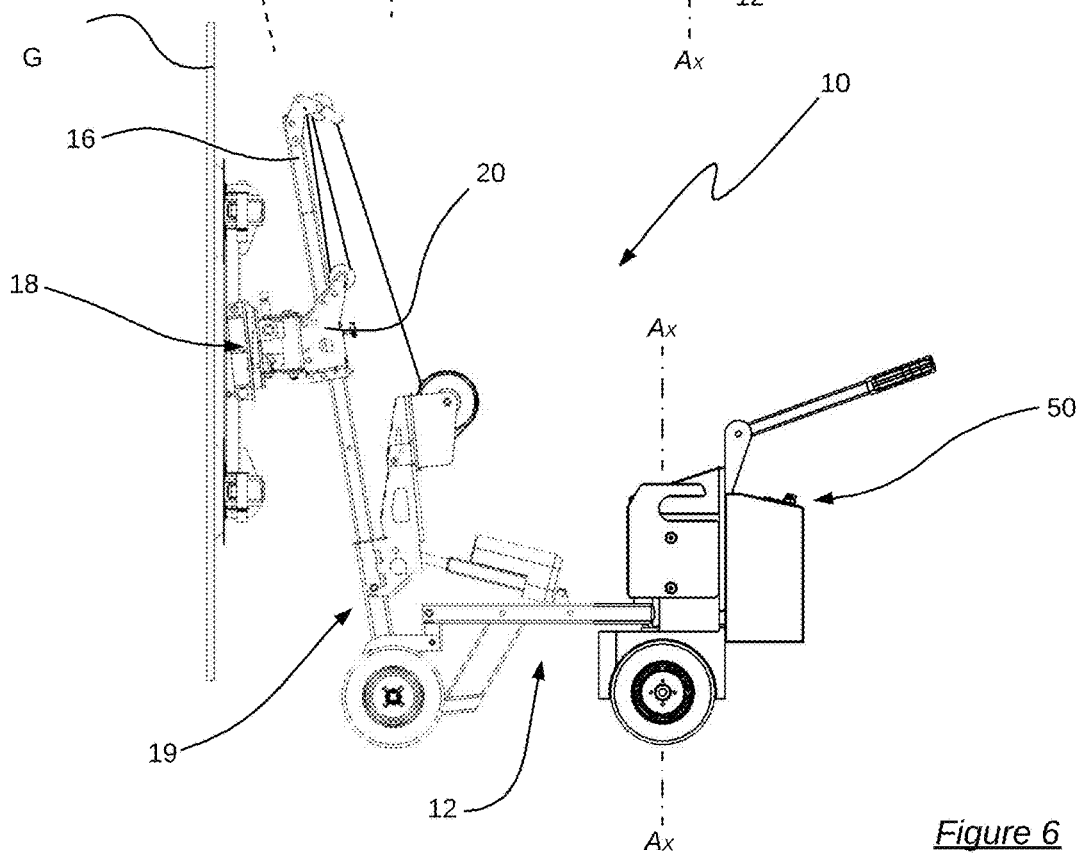
Figure 7:
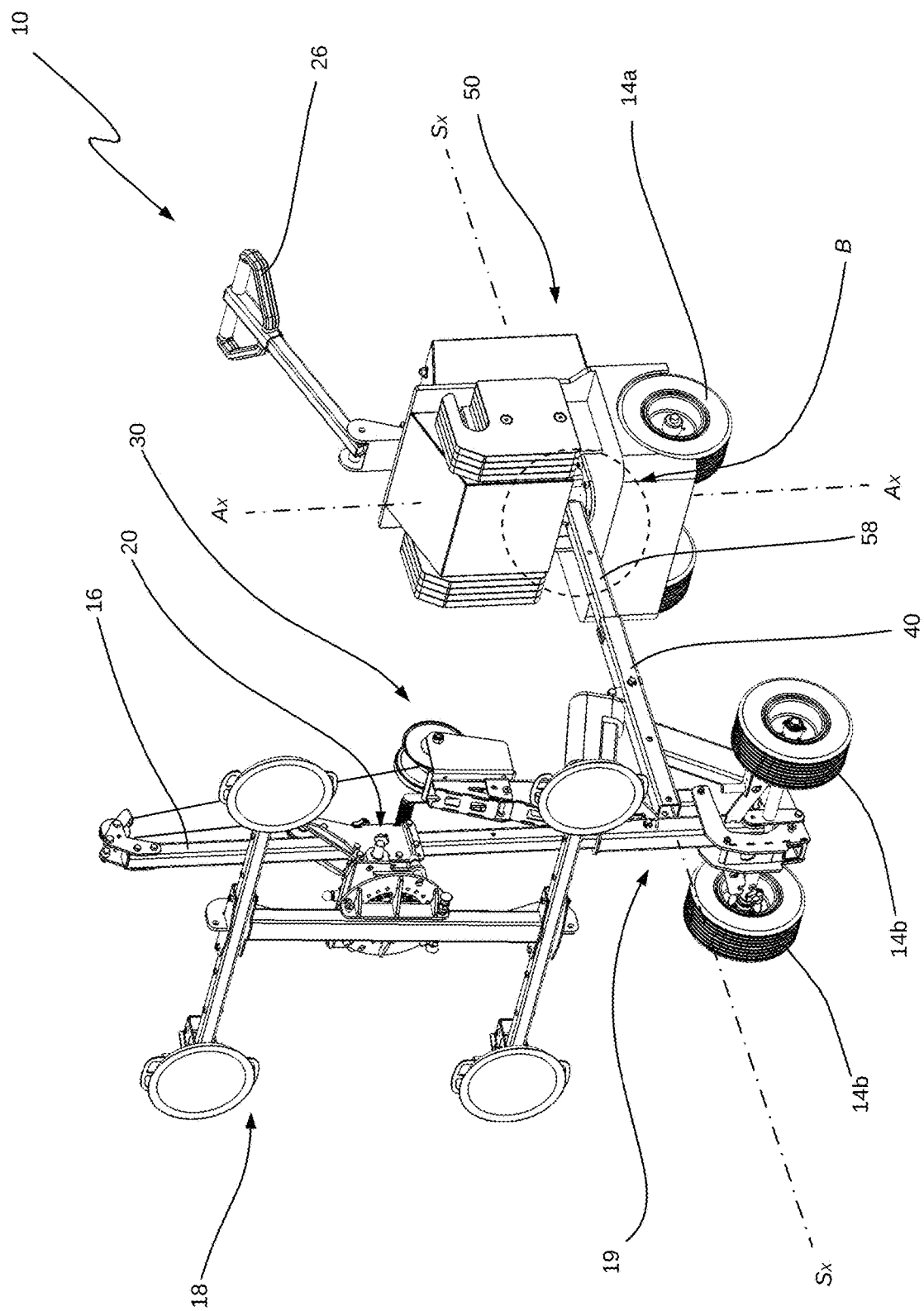
Figure 9:
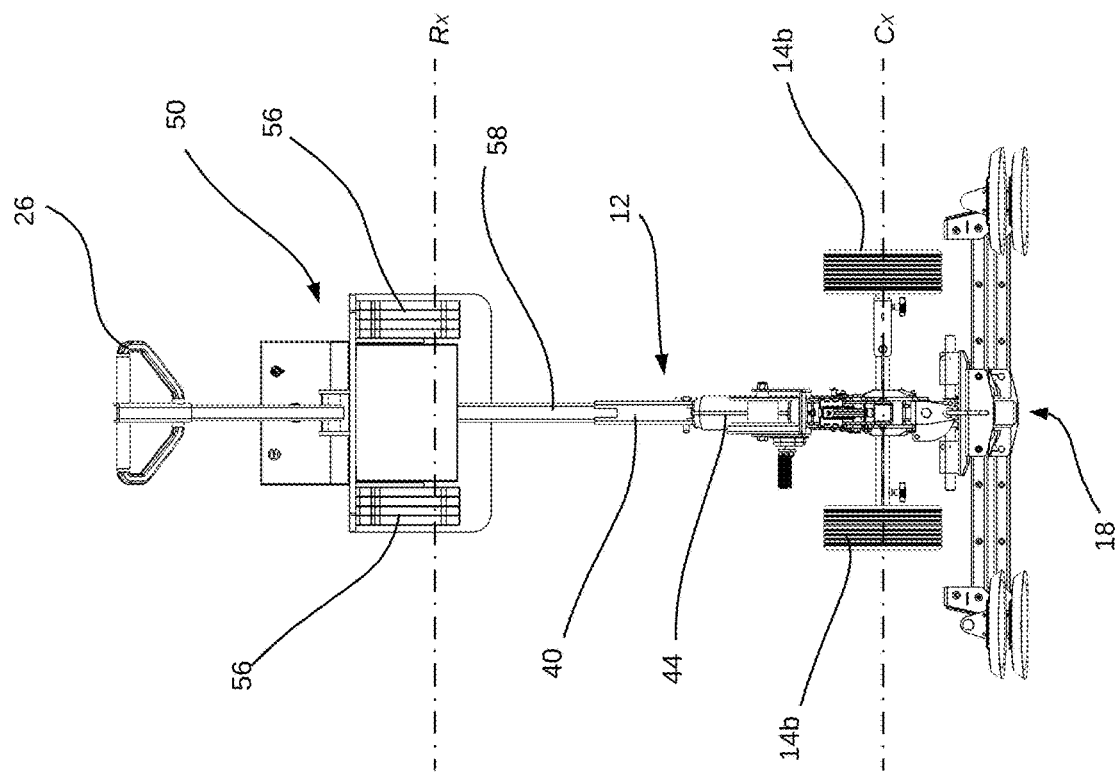
Figure 8:
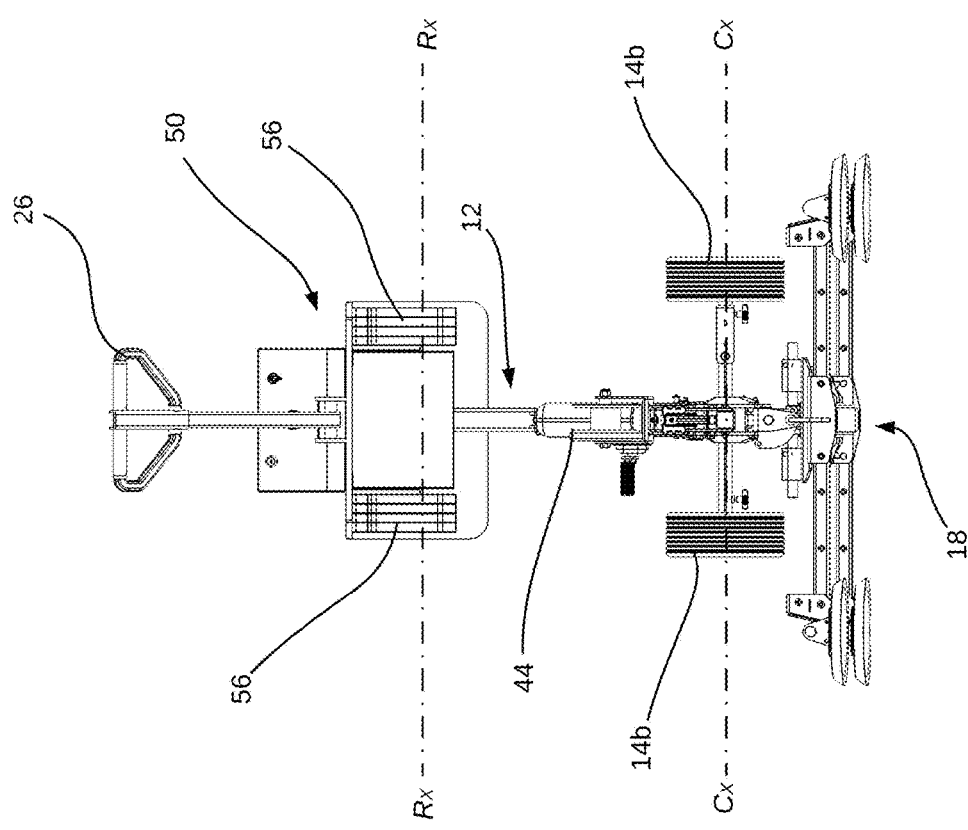
Figure 10:
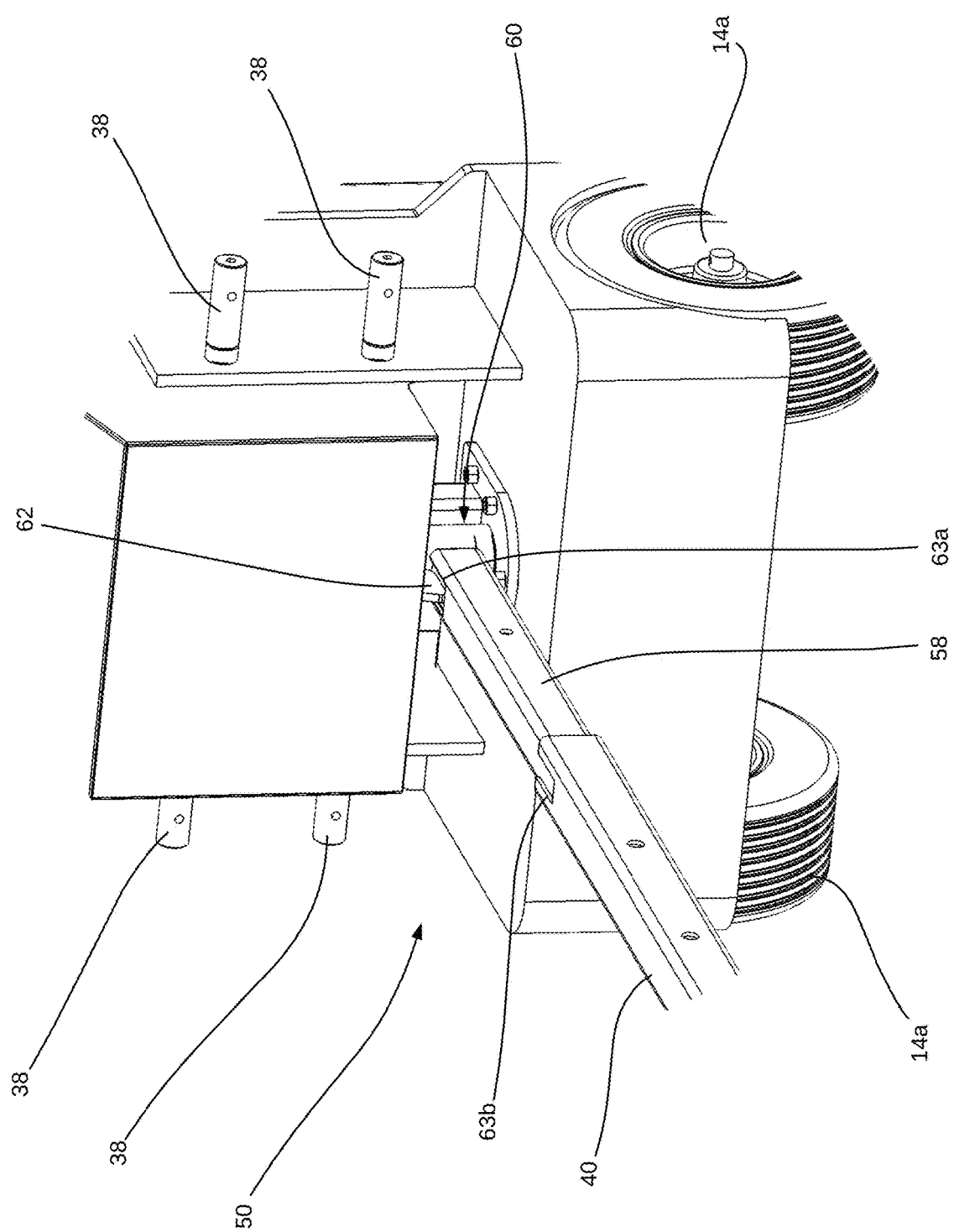
Figure 11:
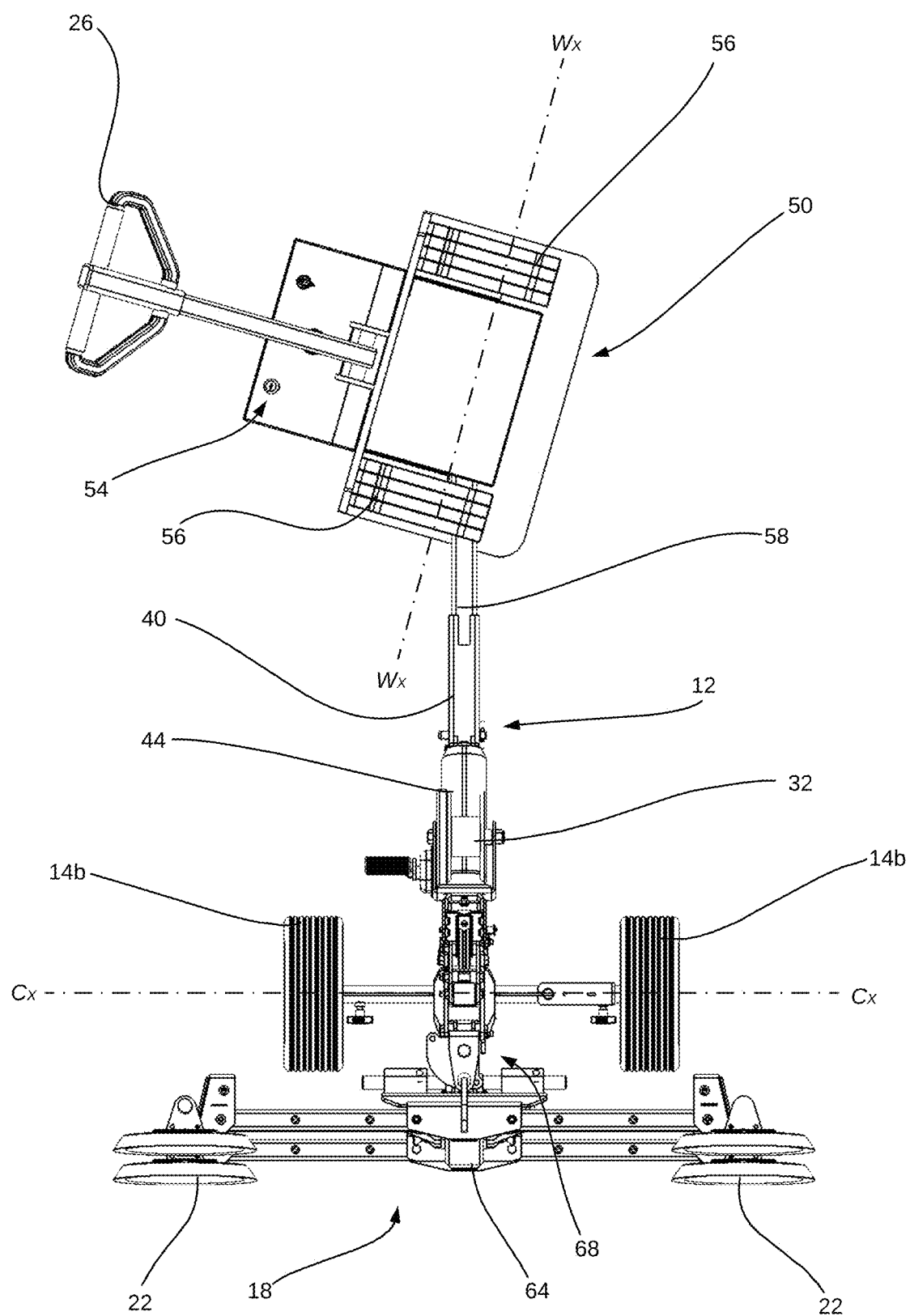
Figure 14:
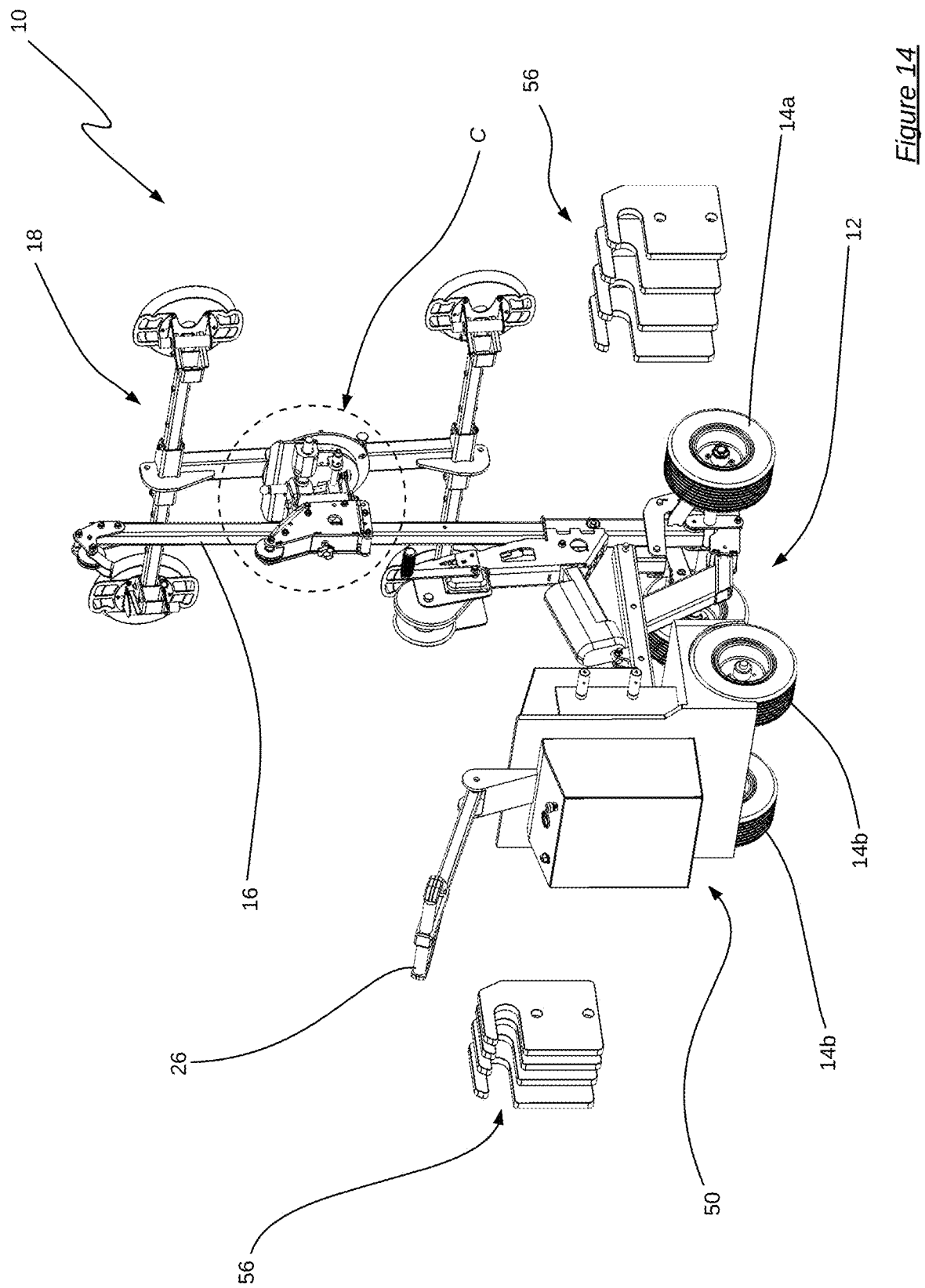
Figure 15:
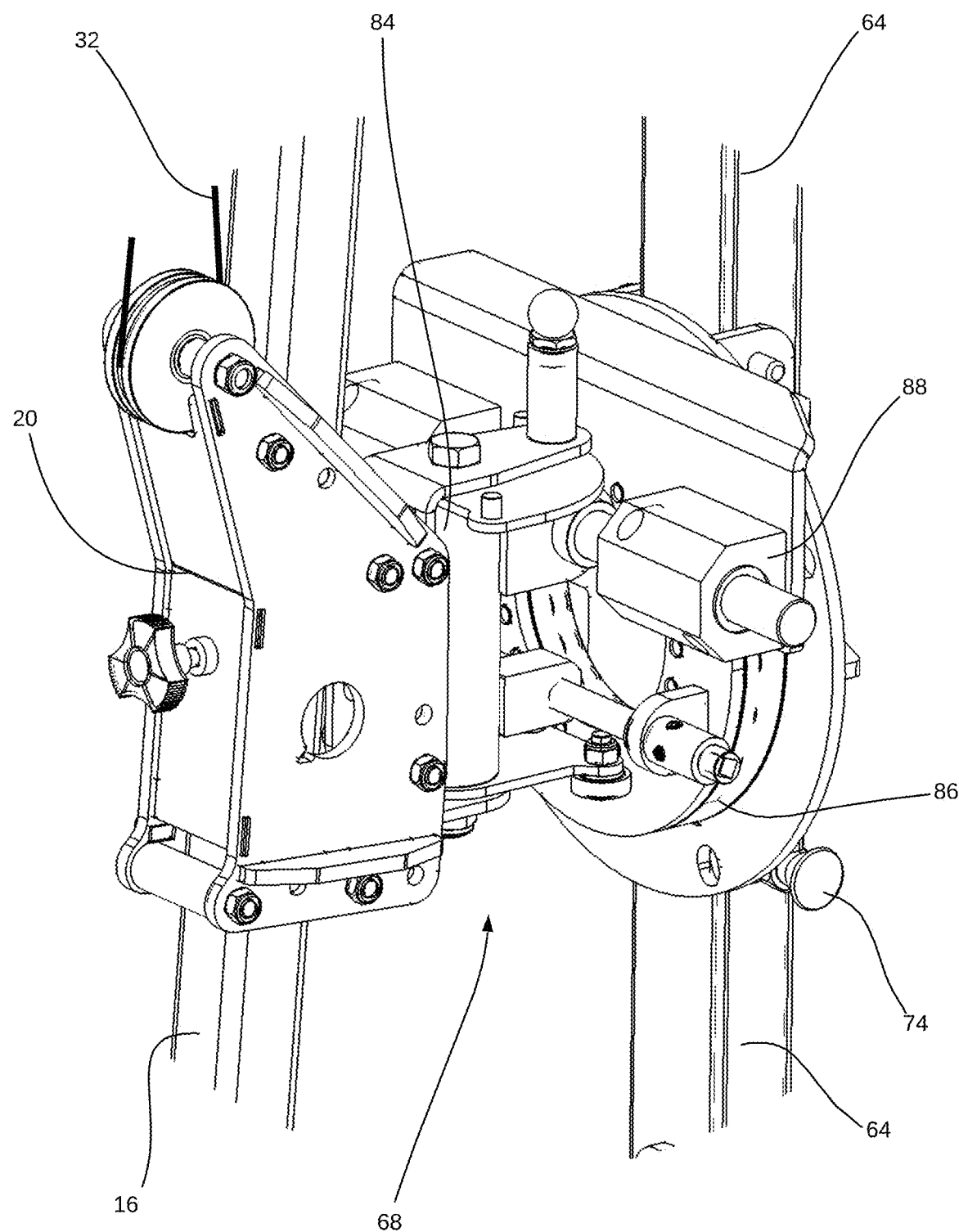
Figure 16:
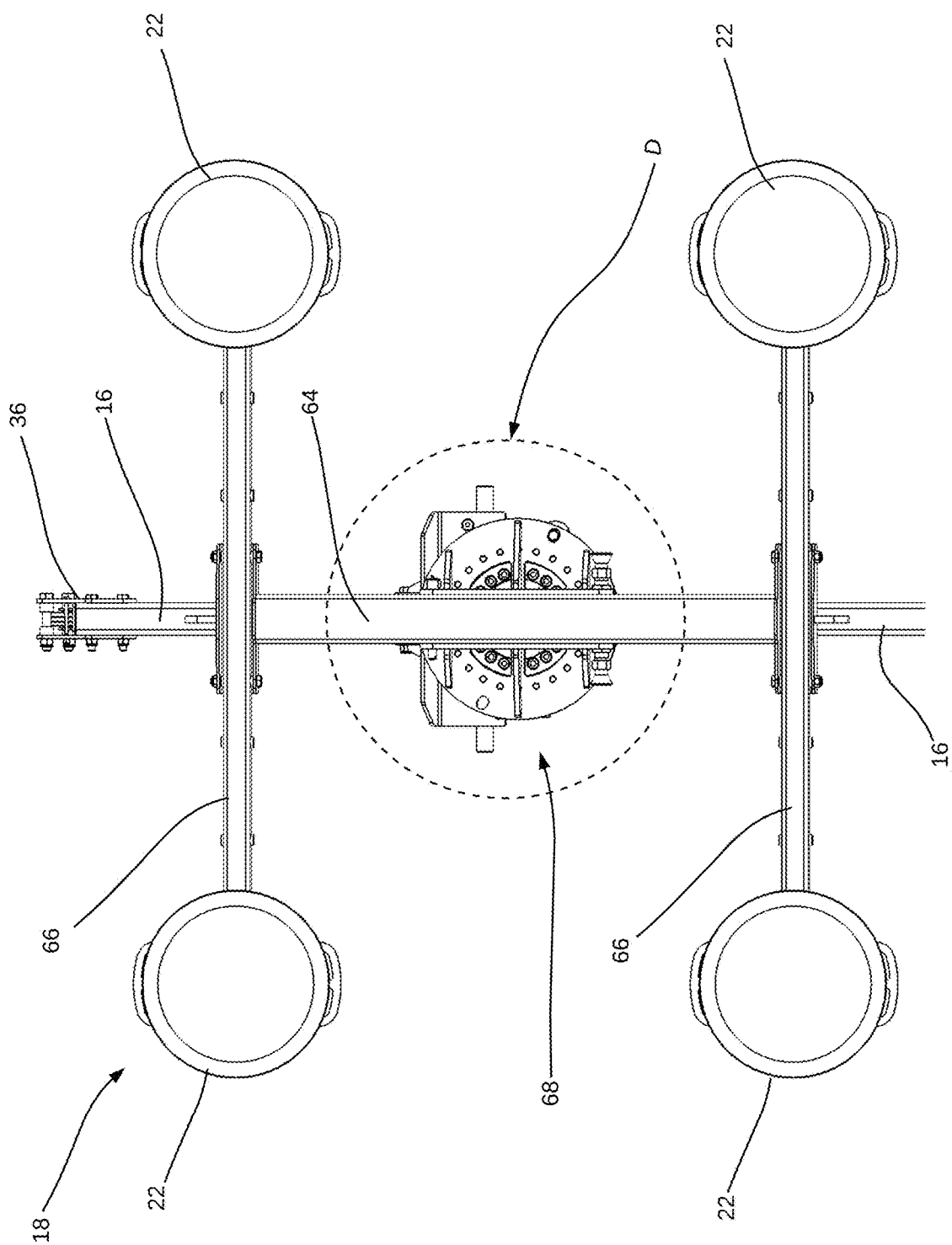
Figure 17:
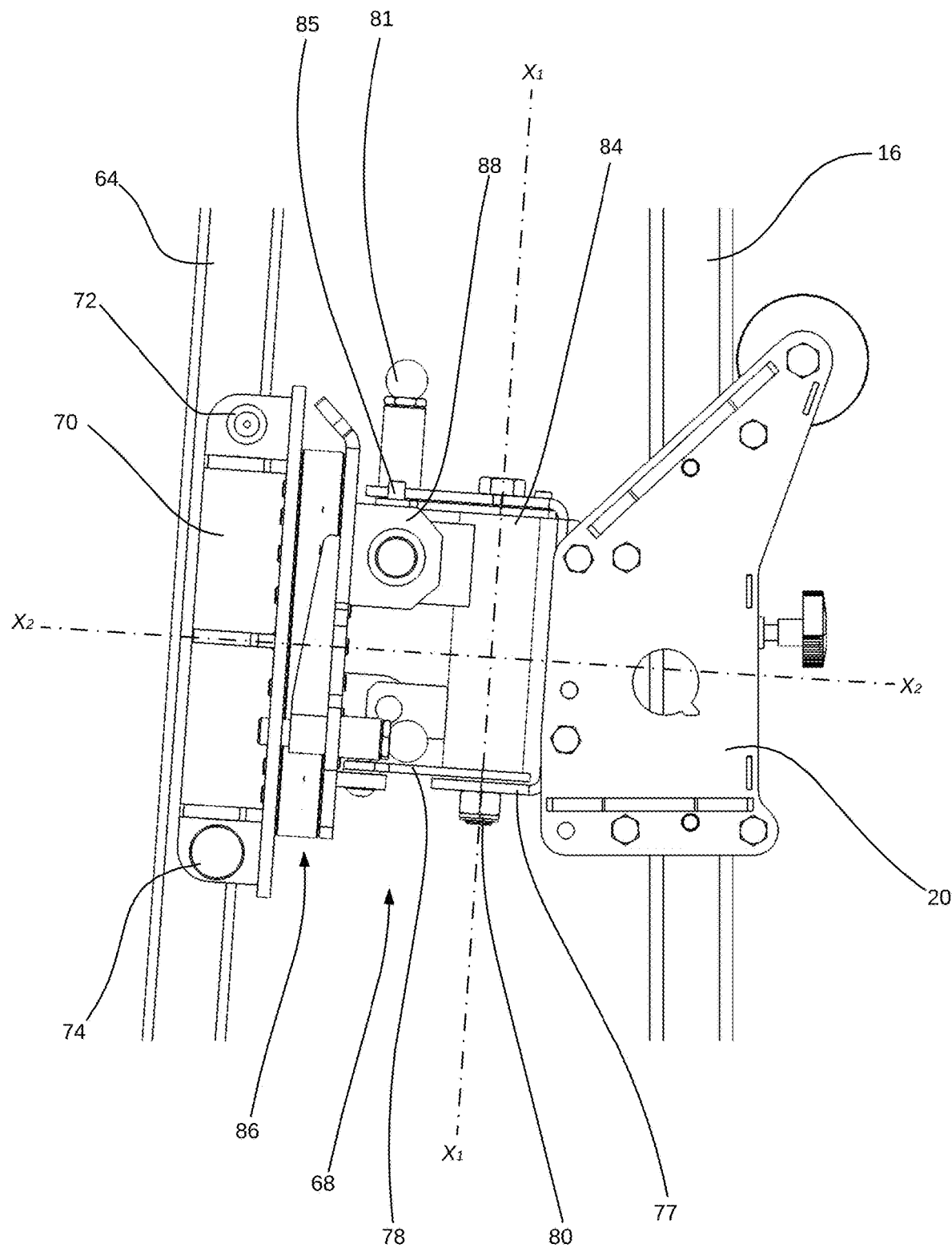
Figure 18:
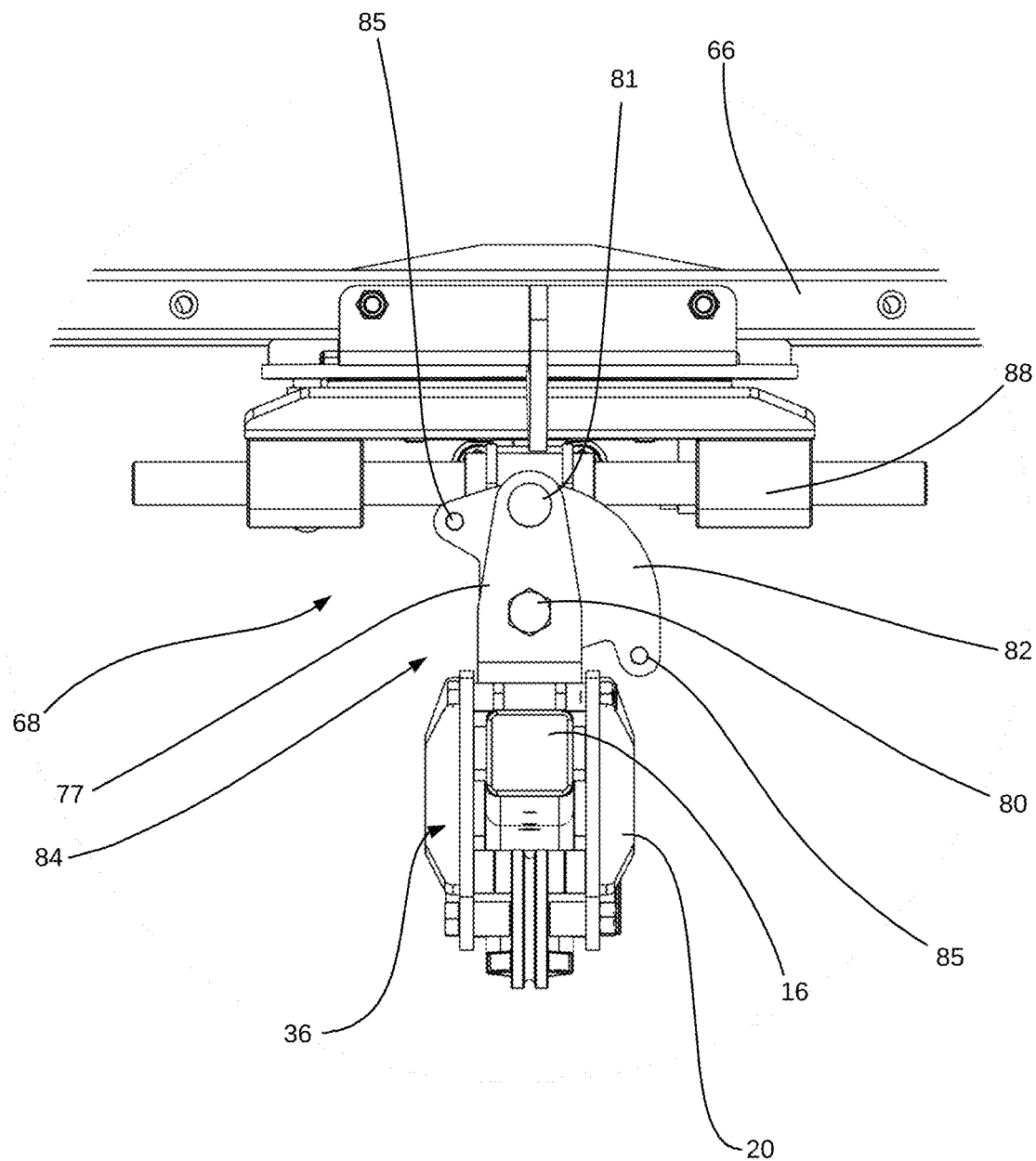
Figure 20:
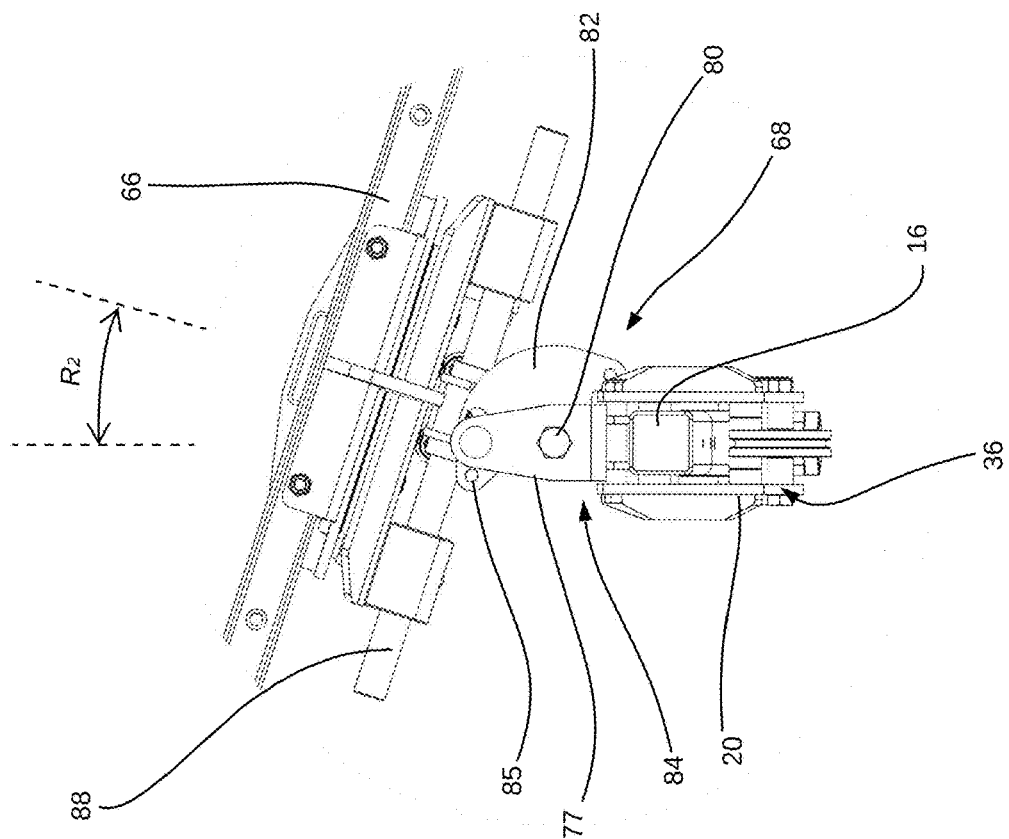
Figure 19:
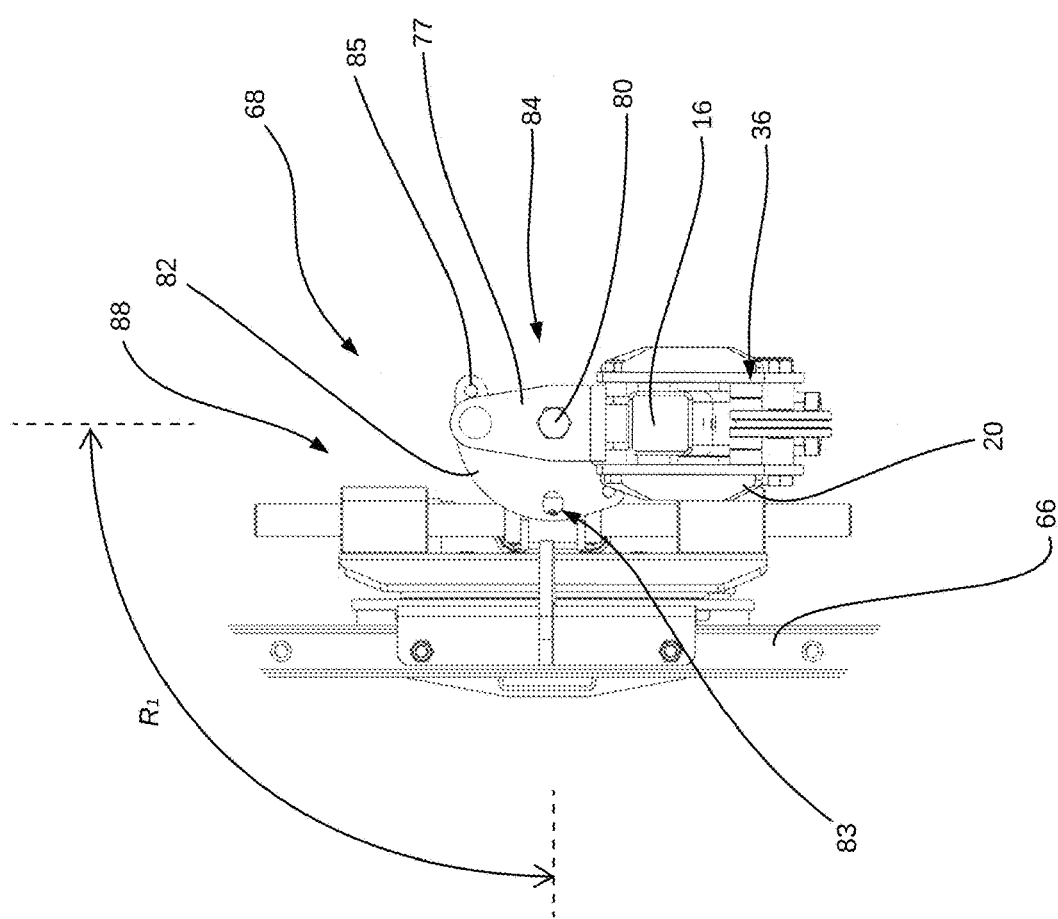
Figure 22:
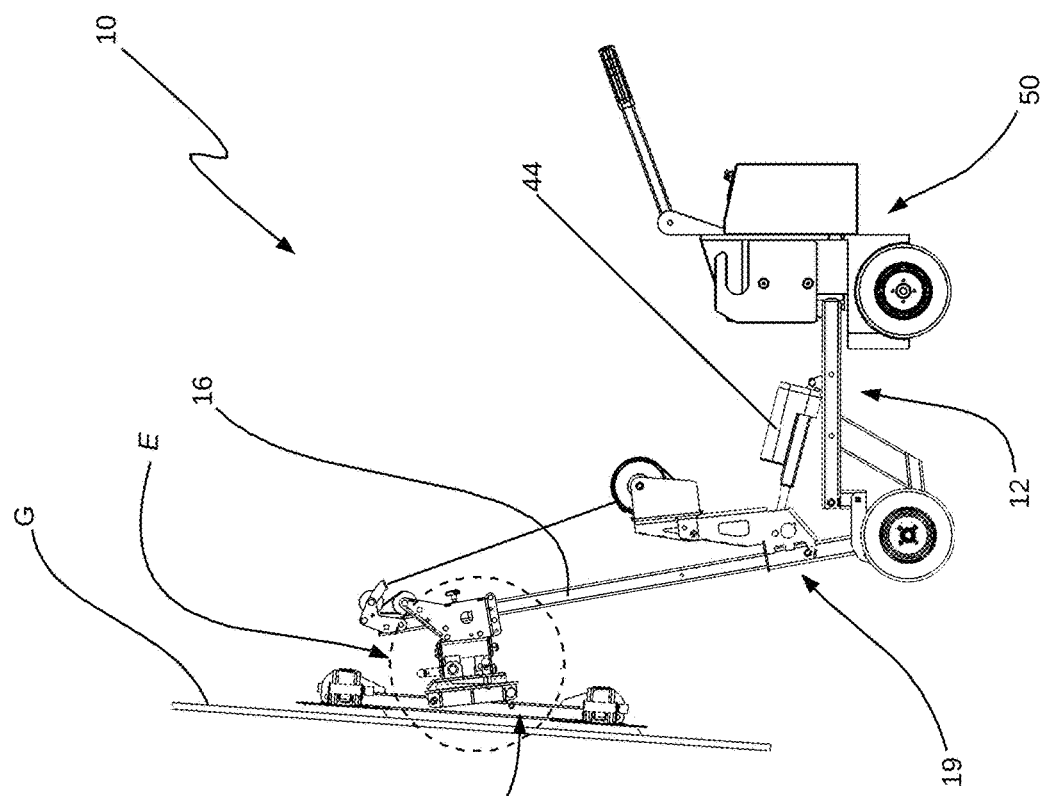
Figure 21:
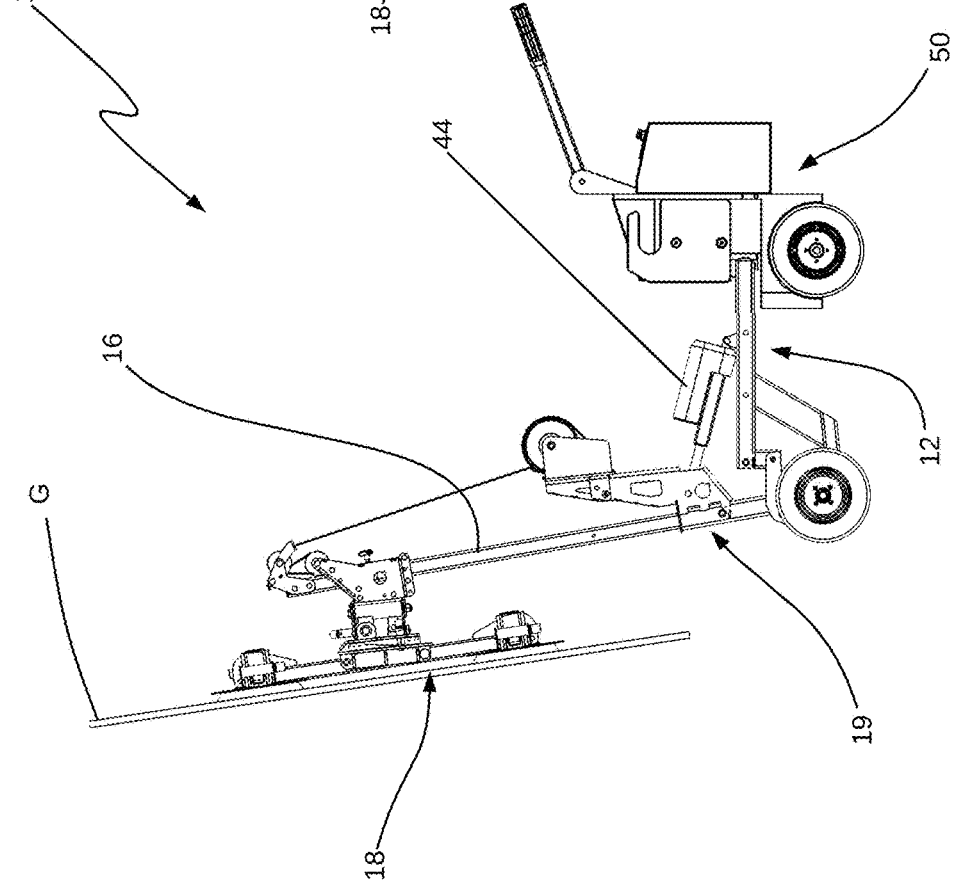
Figure 23:
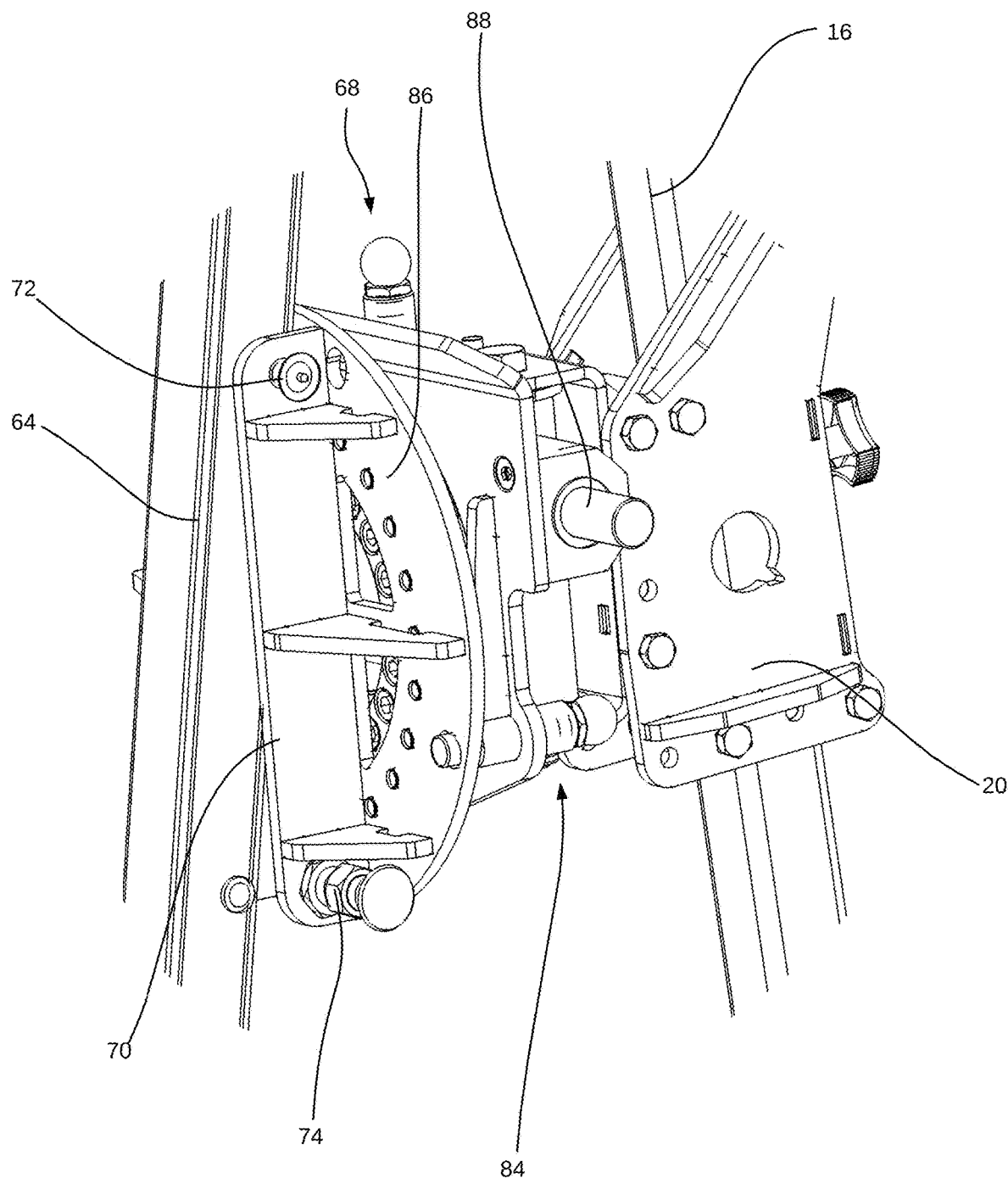
Figure 24:
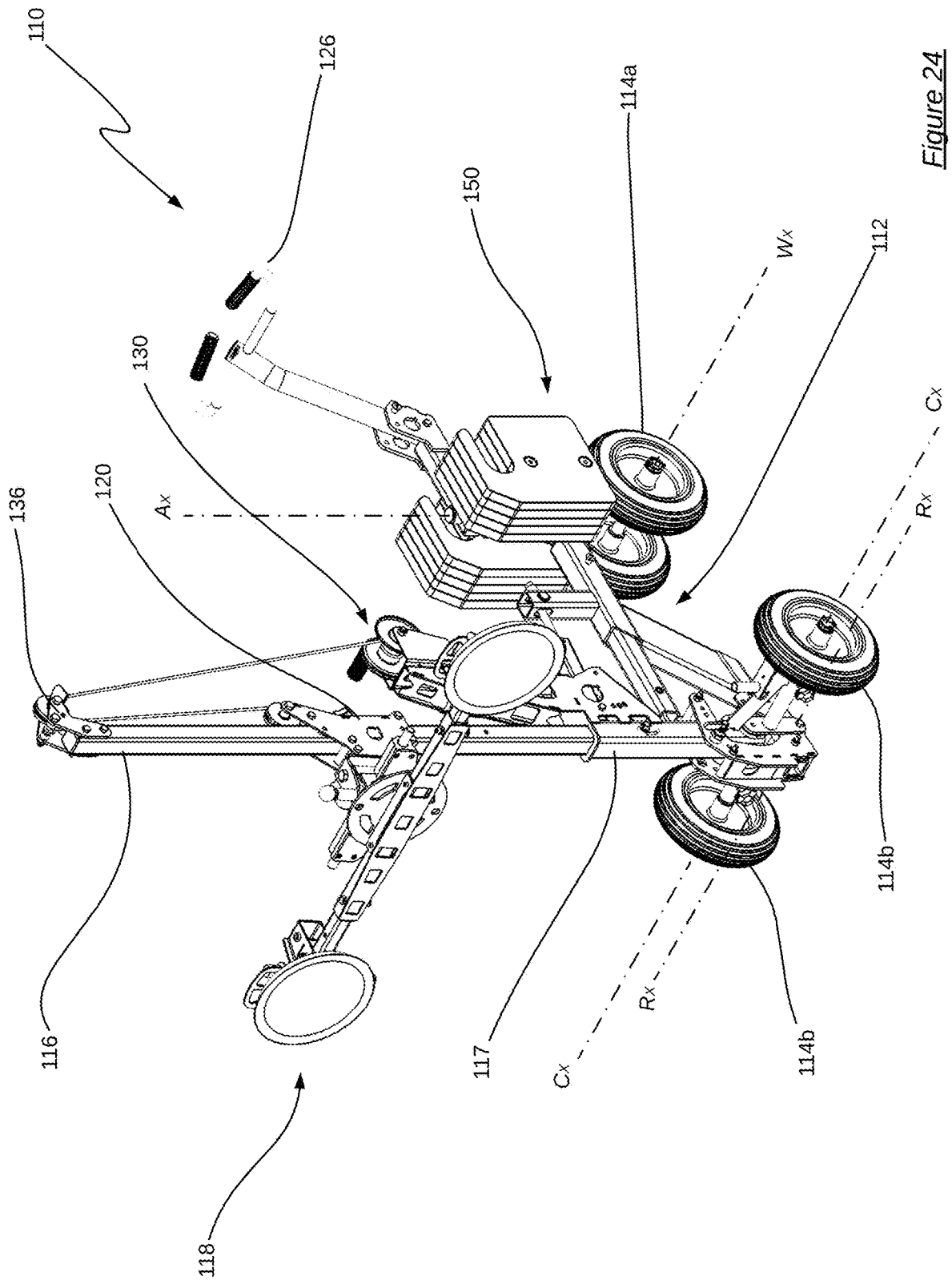
Figures 25, 26:
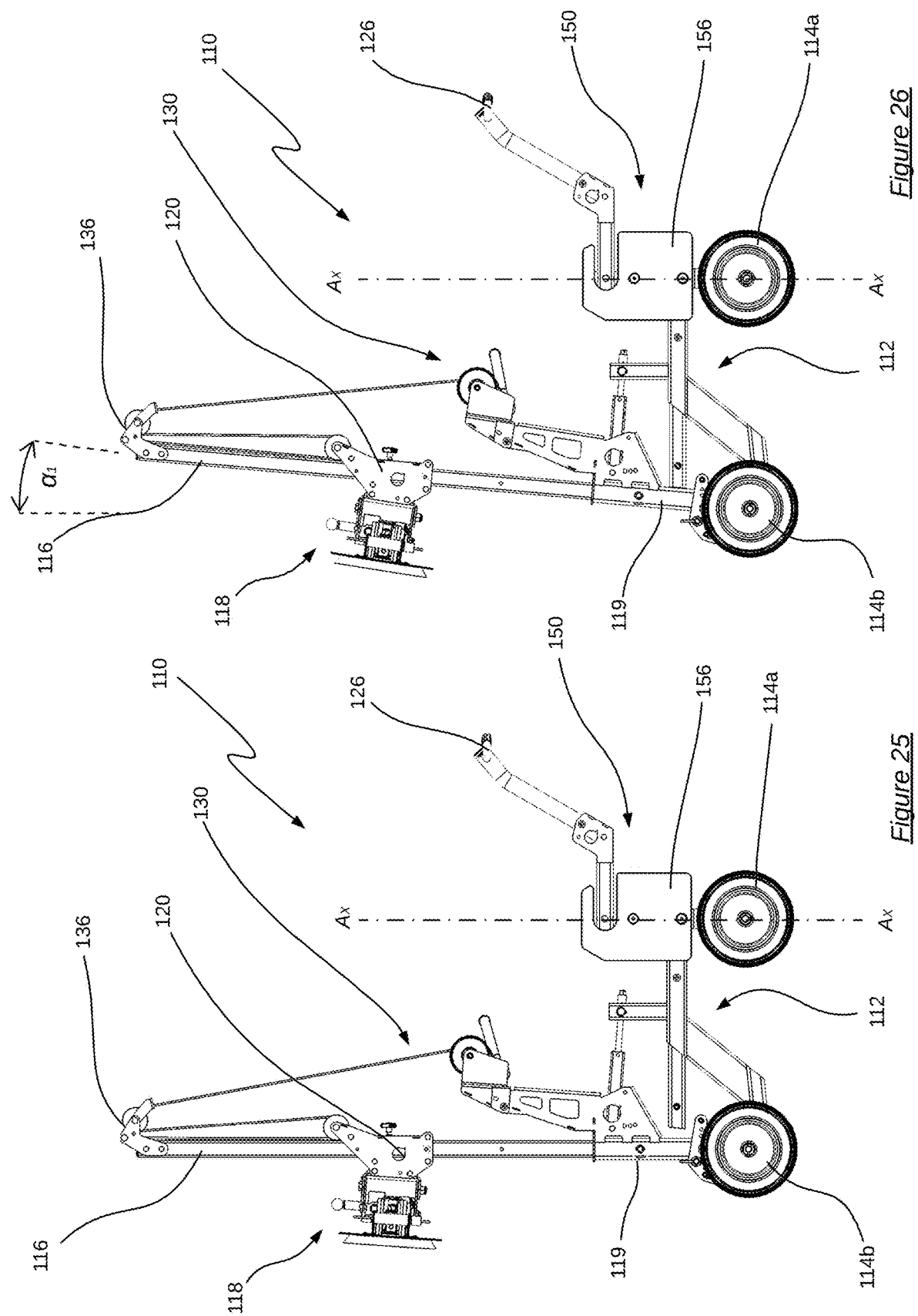
Figure 27:
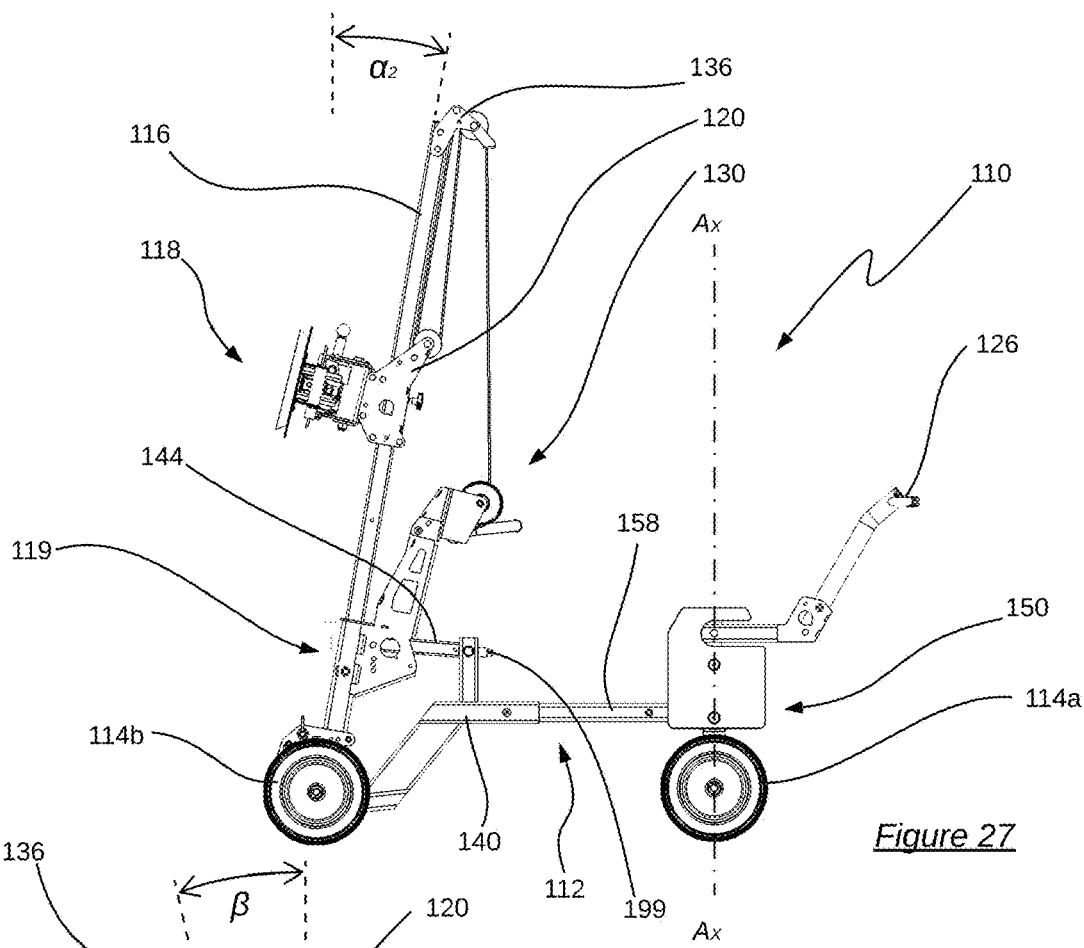
Figure 28:
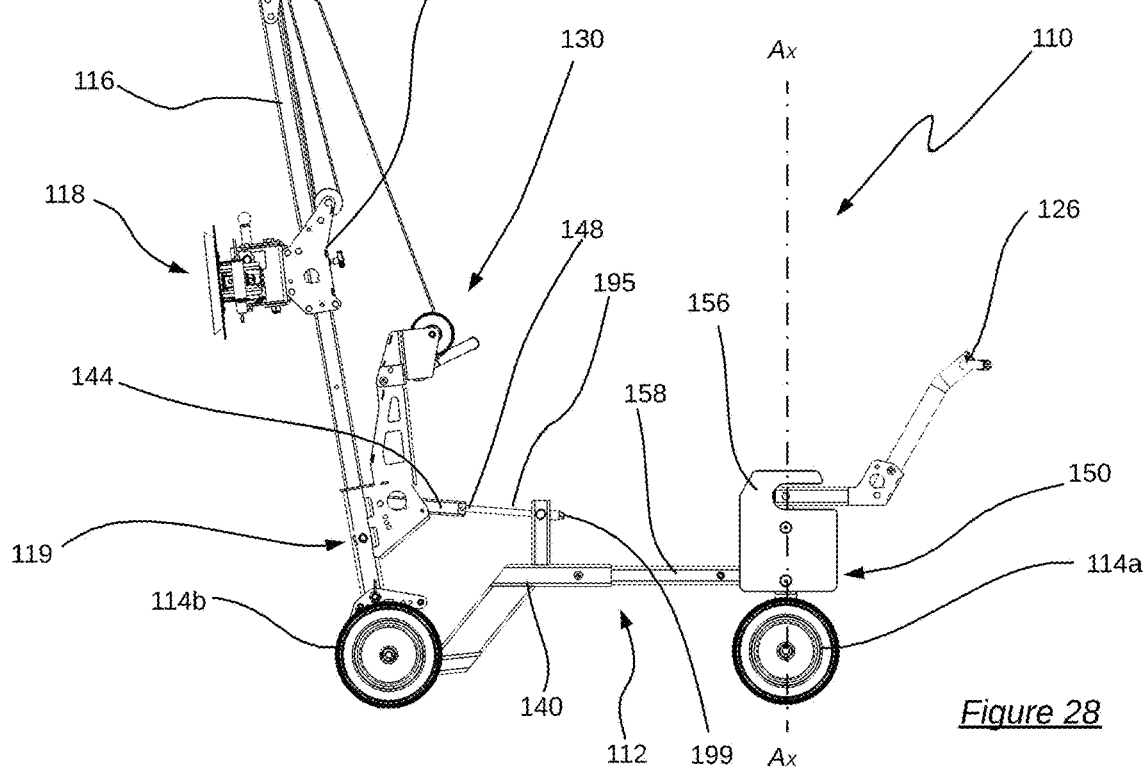
Figure 29:
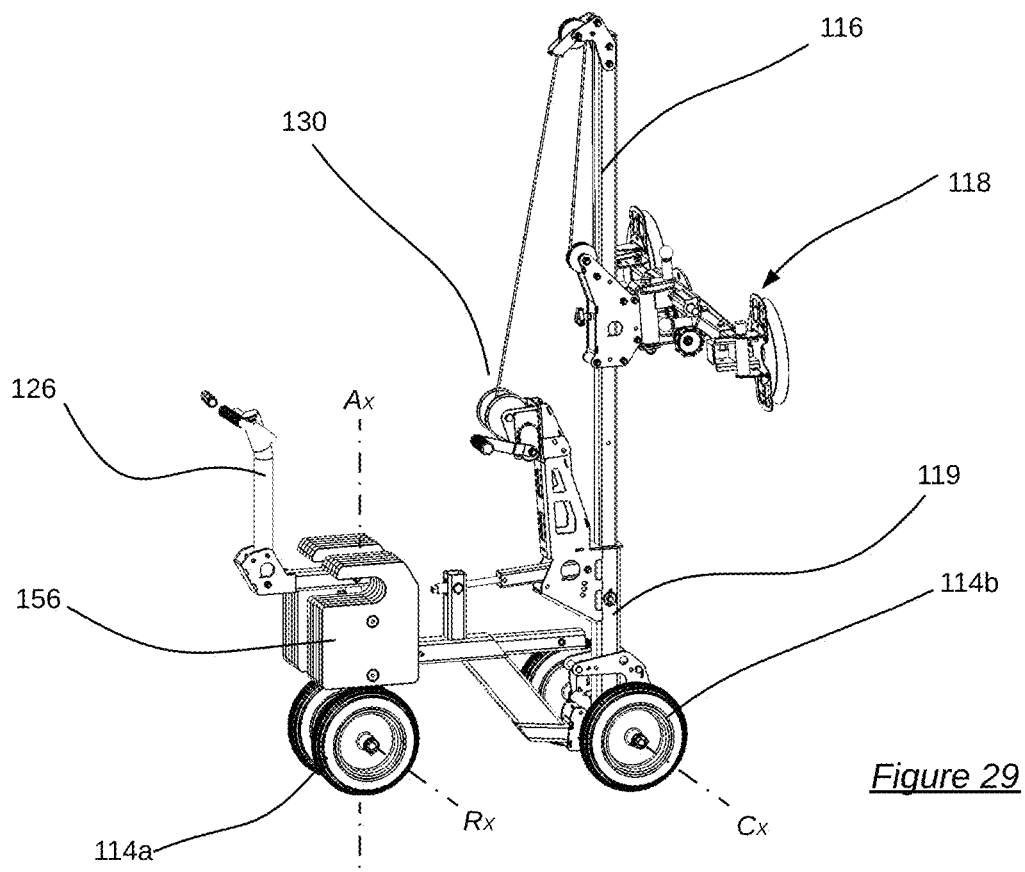
Figure 30:
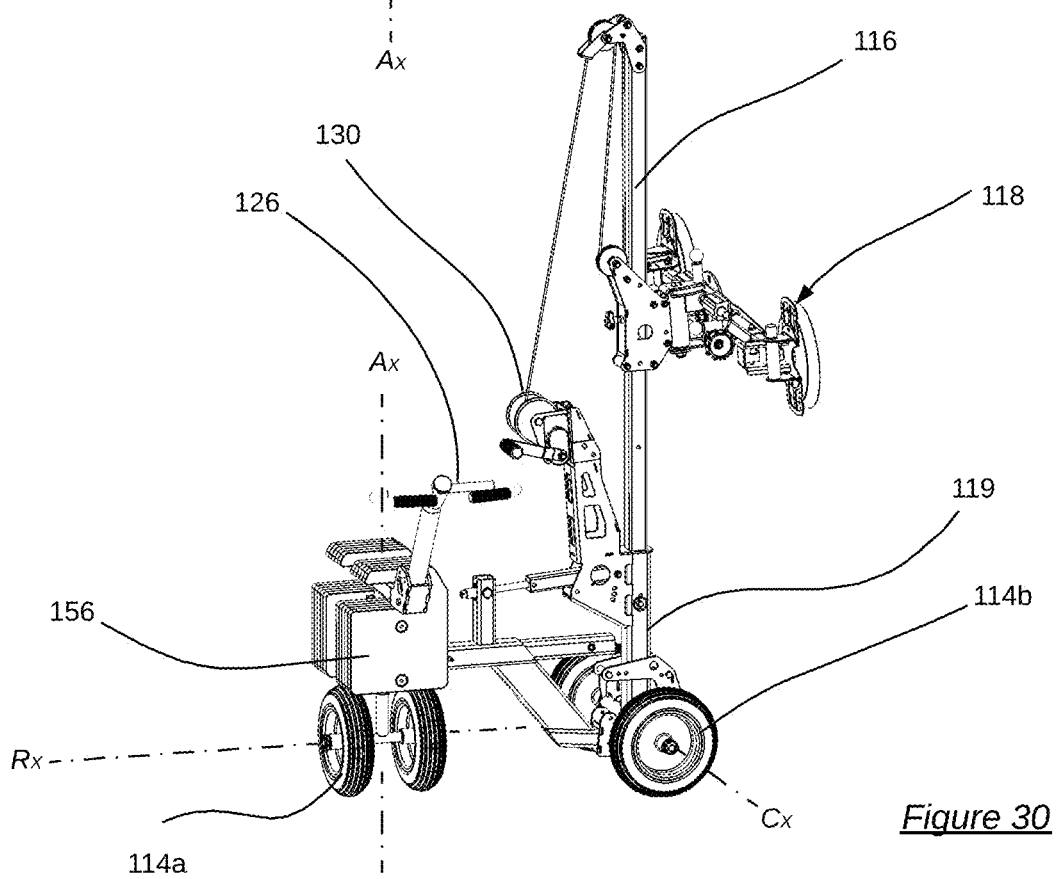
Figure 31:
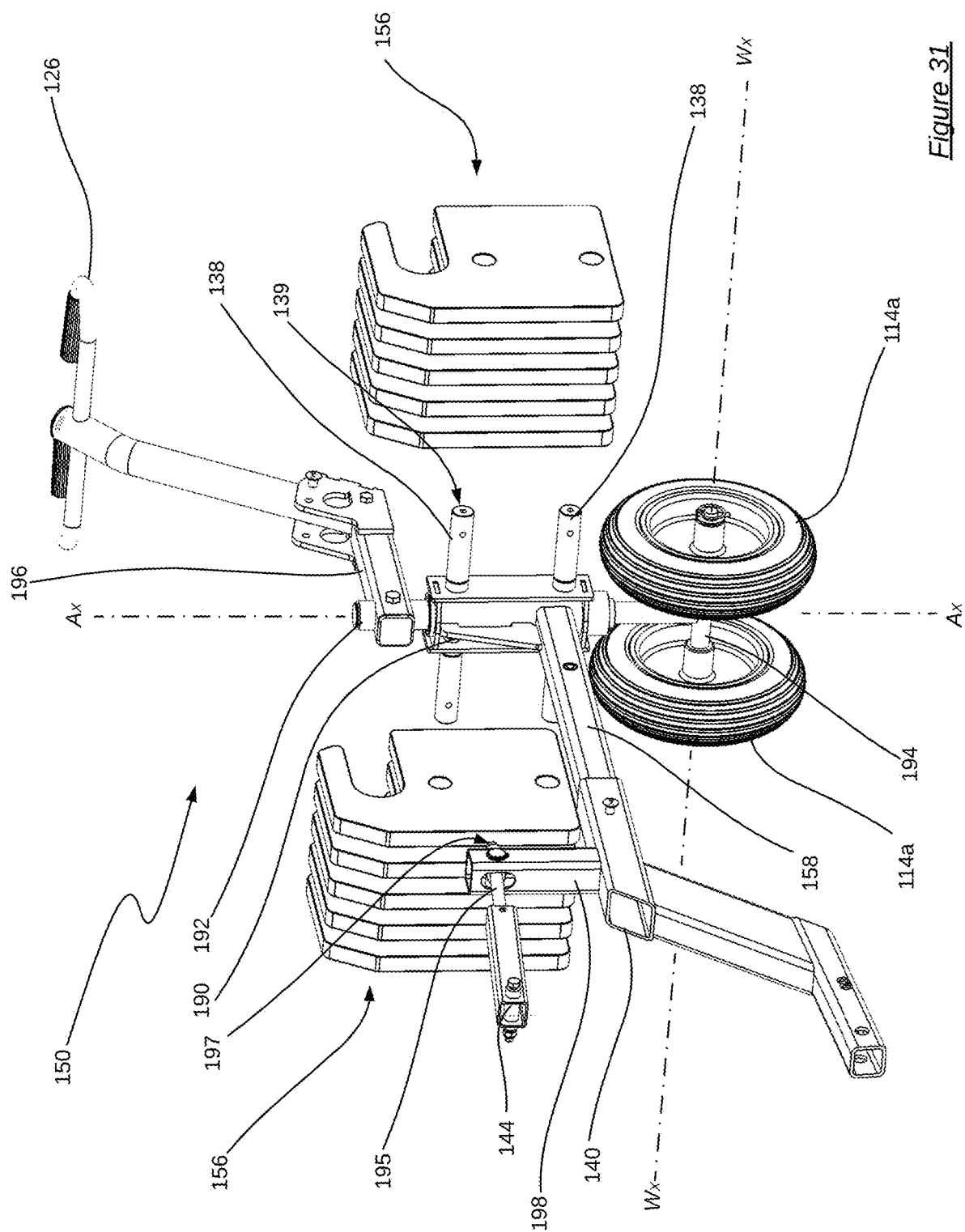
Figure 32:
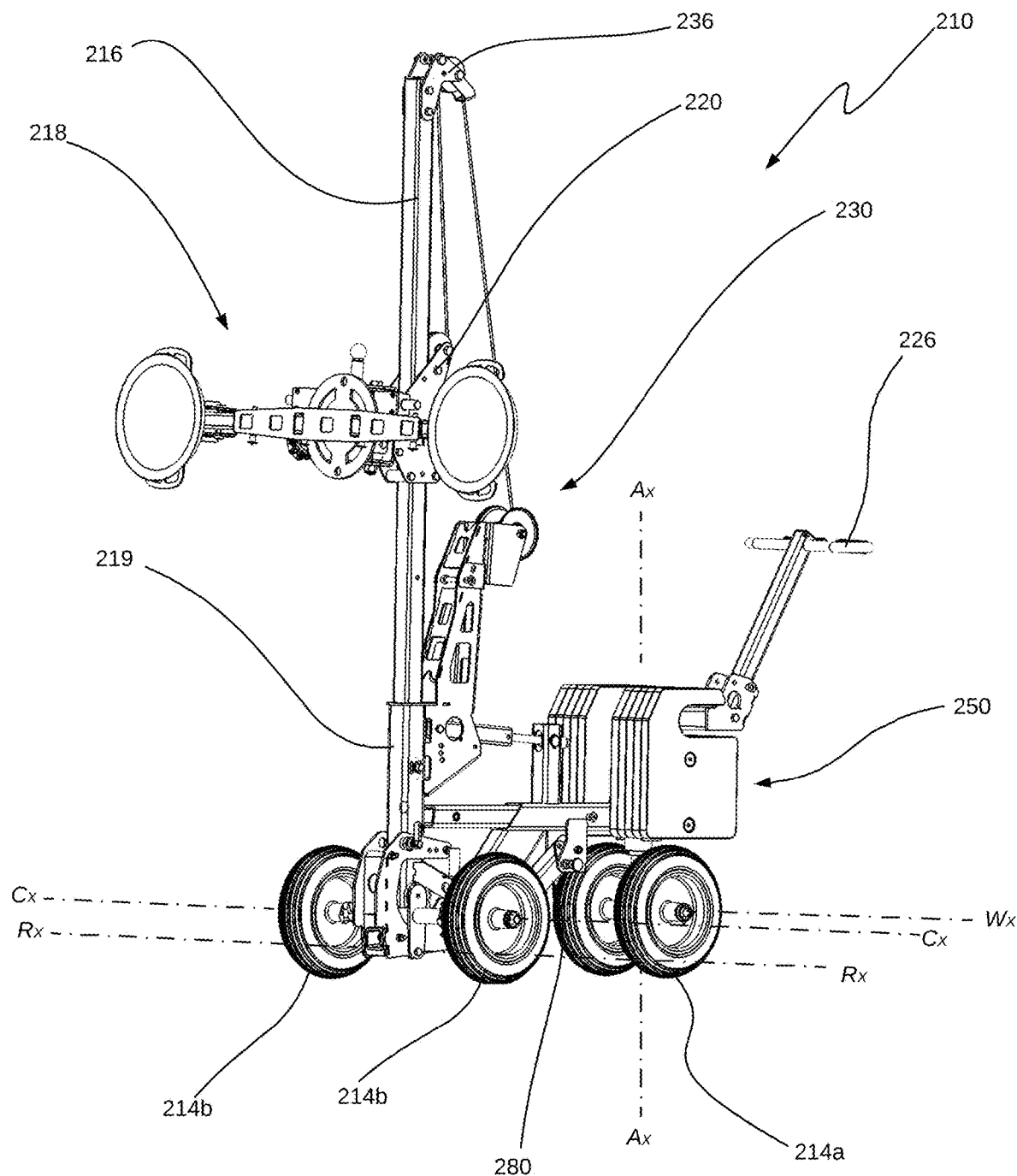
Figure 33:
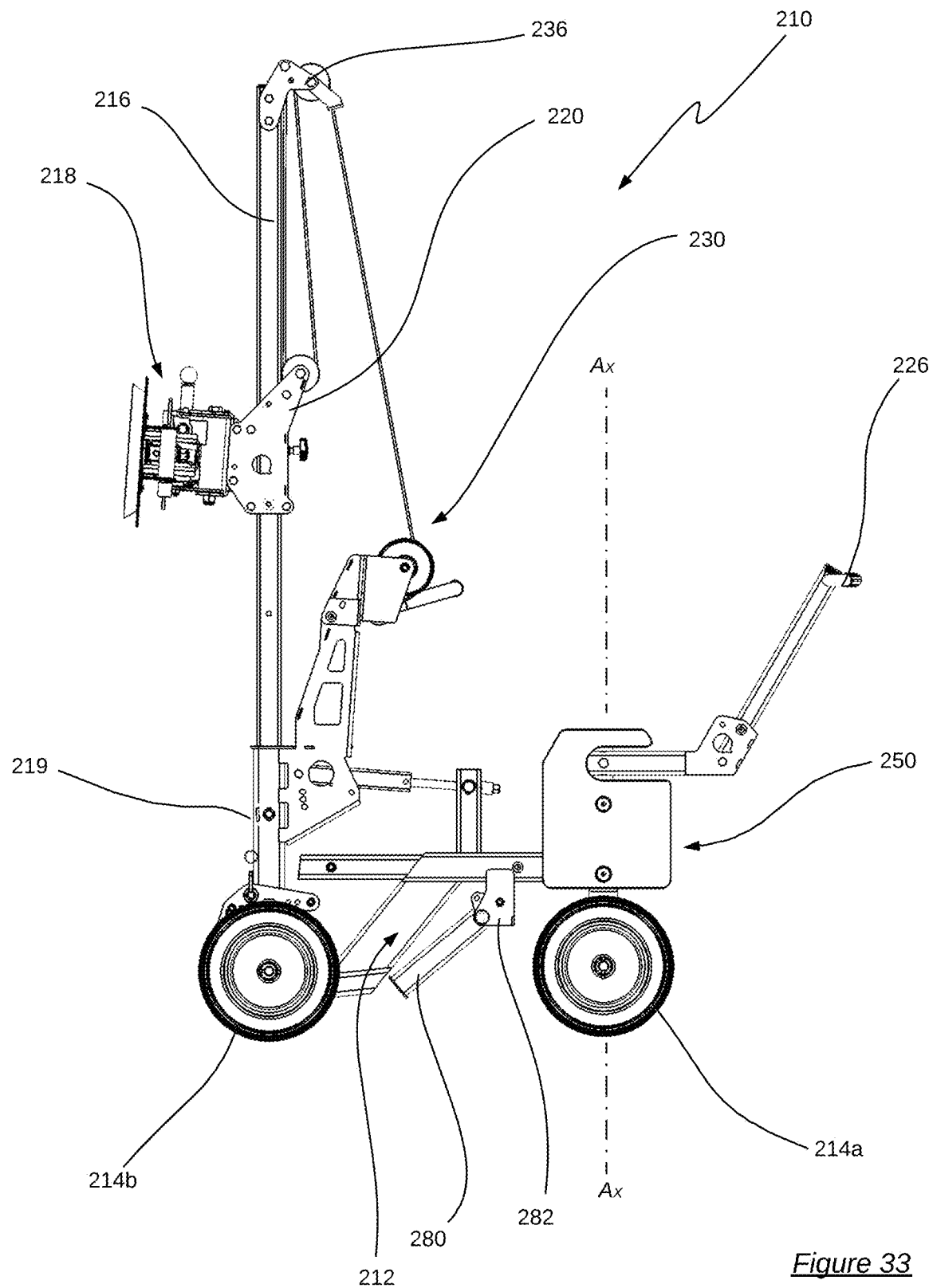
Figure 34:
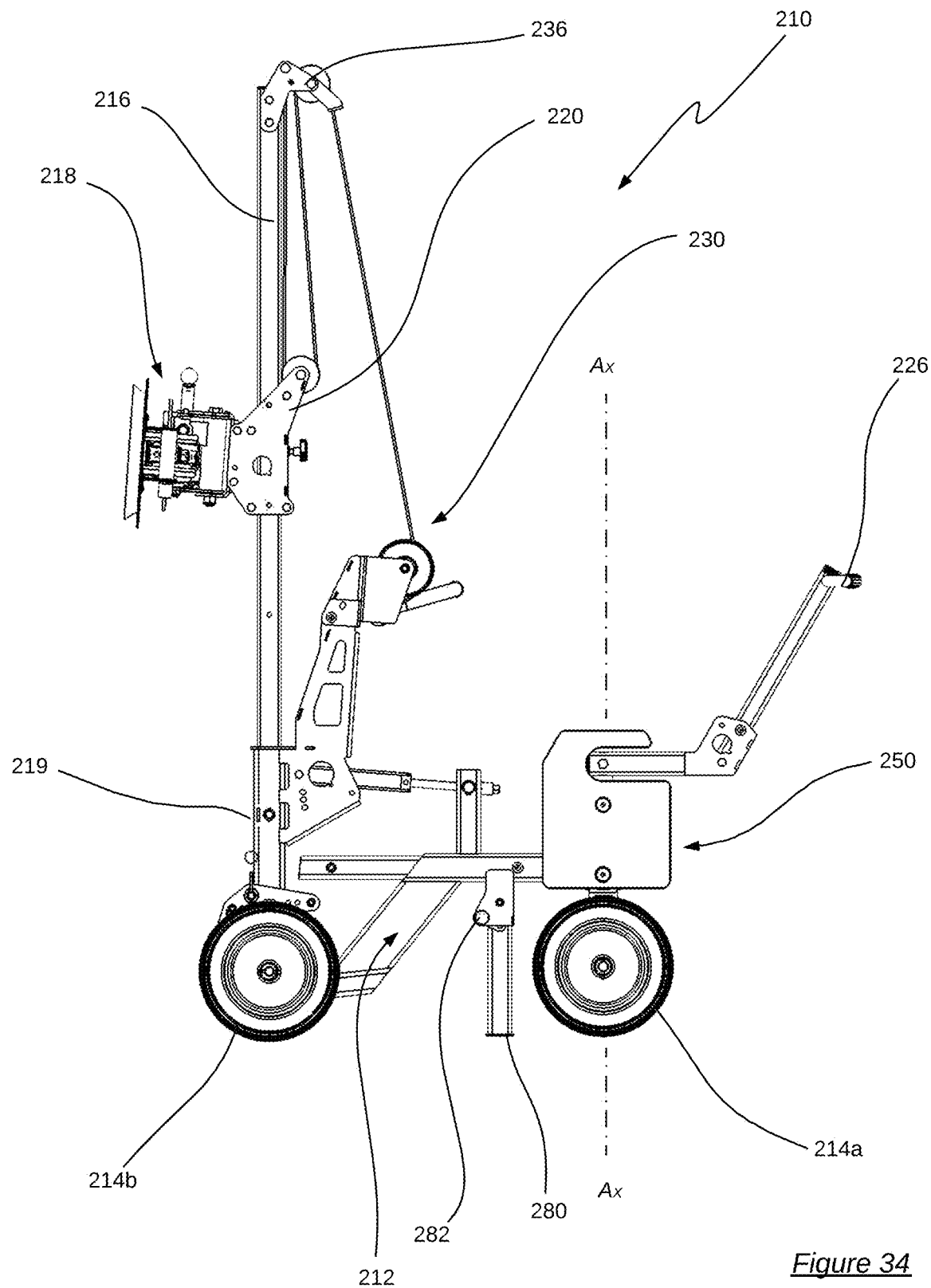
Figure 35:
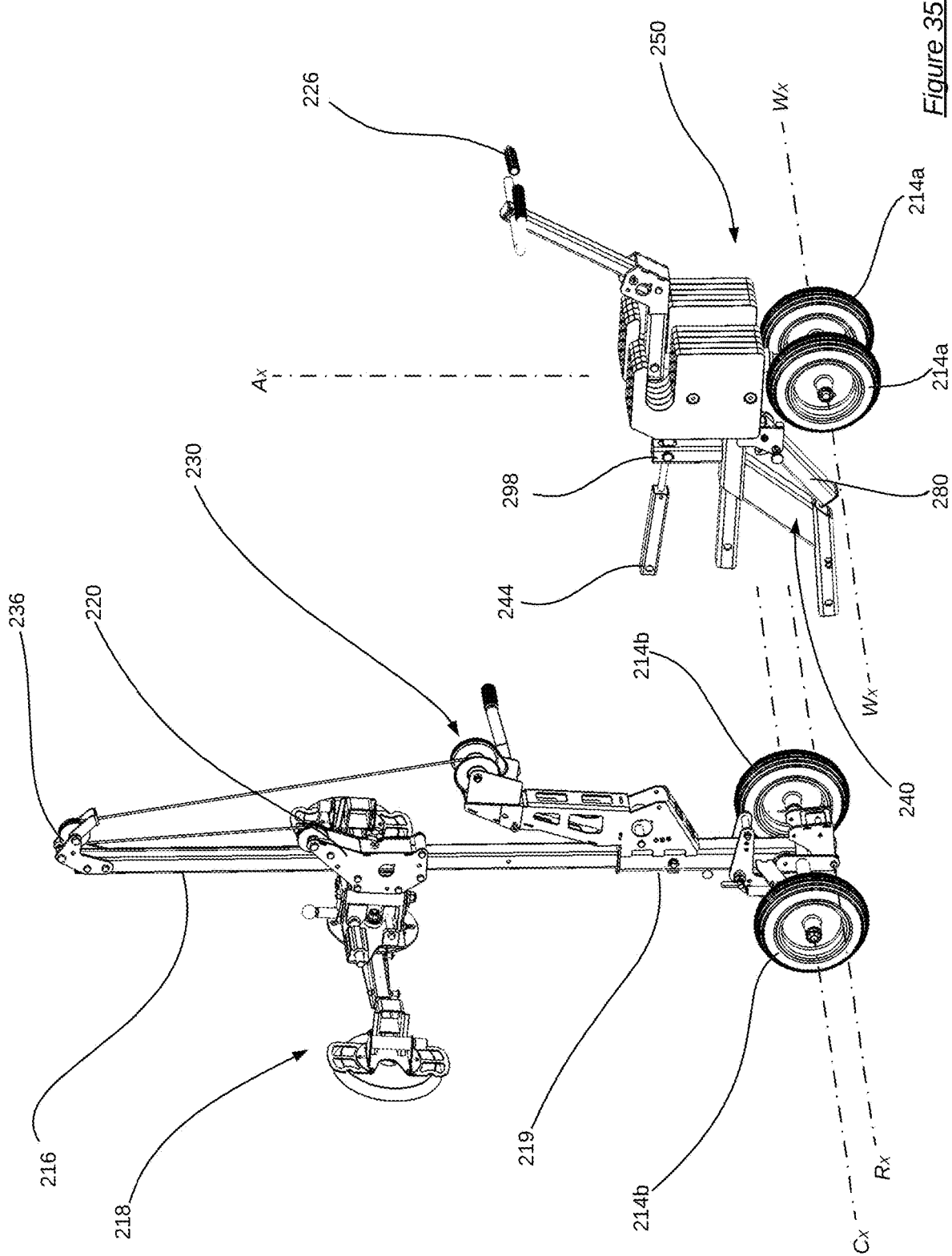

FIG. 1: is a front left perspective view of a sheet material transport and lifting device in accordance with a first embodiment of the present disclosure;

FIG. 2: is a front view of the device of FIG. 1;

FIG. 3: is a left side view of the device of FIG. 1;

FIG. 4: is a vertical cross section view of the device, as viewed along the line A-A in FIG. 2;

FIG. 5: is a left side view of the device of FIG. 1, showing the mast of the device in a rearmost angular position;

FIG. 6: is a left side view of the device of FIG. 1, showing the mast of the device in a forwardmost angular position;

FIG. 7: is a front left perspective view of the device of FIG. 1, showing the base frame of the device in an extended configuration;

FIG. 8: is a top view of the device of FIG. 1, showing the base frame of the device in a contracted configuration;

FIG. 9: is a top view of the device of FIG. 1, showing the base frame of the device in an extended configuration;

FIG. 10: is an enlarged view of Region B in FIG. 7;

FIG. 11: is a top view of the device of FIG. 1, showing the base frame of the device in an extended configuration, and illustrating the steering capacity of the device;

FIG. 12: is a rear view of the device of FIG. 1;

FIG. 13: is a second rear view of the device of FIG. 1, illustrating the canting capacity of the rear drive unit;

FIG. 14: is a rear perspective view of the device of FIG. 1;

FIG. 15: is an enlarged view of Region C in FIG. 14;

FIG. 16: is an enlarged partial front view of the device of FIG. 1;

FIG. 17: is an enlarged left side view of Region D in FIG. 16;

FIG. 18: is an enlarged partial top view of the device of FIG. 1;

FIG. 19: is an enlarged partial top view of the device of FIG. 1, showing the supporting head is in a second position;

FIG. 20: is an enlarged partial top view of the device of FIG. 1, showing the supporting head is in a third position;

FIG. 21: is a left side view of the device of FIG. 1, showing the mast of the device in a forwardmost angular position, and the supporting head in its uppermost position on the mast;

FIG. 22: is a left side view of the device as shown in FIG. 21, with the supporting head in a free pivoting configuration;

FIG. 23: is an enlarged view of Region E in FIG. 22;

FIG. 24: is a front left perspective view of a sheet material transport and lifting device in accordance with a second embodiment of the present disclosure;

FIG. 25: is a left side view of the device of FIG. 24, showing the base frame of the device in a contracted configuration;

FIG. 26: is a left side view of the device of FIG. 24, showing the base frame of the device in a contracted configuration, and the mast of the device in a rearward angular position;

FIG. 27: is a left side view of the device of FIG. 24, showing the base frame of the device in an extended configuration, and the mast of the device in a rearmost angular position;

FIG. 28: is a left side view of the device of FIG. 24, showing the base frame of the device in an extended configuration, and the mast of the device in a forwardmost angular position;

FIG. 29: is a right rear perspective view of the device of FIG. 24;

FIG. 30: is a right rear perspective view of the device of FIG. 24, illustrating the steering capacity of the device;

FIG. 31: is a perspective view of the rear unit of the device of FIG. 24 in a disassembled state;

FIG. 32: is a front left perspective view of a sheet material transport and lifting device in accordance with a third embodiment of the present disclosure;

FIG. 33: is a left side view of the device of FIG. 32;

FIG. 34: is a left side view of the device of FIG. 32, showing the propping leg in a lowered position; and FIG. 35: is a left rear perspective view of the device of FIG. 32, showing the device in a partly disassembled state.

Corresponding reference numerals indicate corresponding parts or features throughout the several views of the drawings.

DETAILED DESCRIPTION

Example embodiments will now be described more fully with reference to the accompanying drawings.

FIGS. 1 to 23 show a device 10 according to a first embodiment of the present disclosure. The device 10 is intended for use in lifting, transporting and installing sheet material.

The device 10 includes a base 12, and rear wheels 14*a* and front wheels 14*b* on which the base 12 is supported. The wheels 14*a*, 14*b* enable the base portion 12, and thus the device 10, to be moved across a surface. As described in further detail in reference to FIGS. 10 and 11, the rear wheels 14*a* are connected to the rear of the device 10 in a manner that permits steering.

The front wheels 14*b*, which are connected to the front of the base 12, include a wheel to each side of the device 10. The wheels of the front wheel set being rotatable about a common axis $C_X$. In this example, the device 10 has a single wheel on each side of the device 10, but in some other embodiments there may be two or more front wheels on each side of the device 10. In this particular embodiment, the front wheels 14b are mounted on an axle 15 so as to rotate independently of each other.

The device 10 includes a mast 16 that extends upwardly from the base portion 12. The base 12 includes a sleeve 17, into which the lower end of the mast 16 is located and secured.

A supporting head 18 that is configured to support sheet material is mounted on a carriage 20. The carriage 20 is in engagement with the mast 16 in a manner that enables the carriage 20 to be displaceable along the mast 16, and also be guided by the mast 16. In this particular embodiment, the supporting head 18 has four vacuum grips 22 at opposing ends of a cross bar 24.

The base 12 includes a frame that interconnects the rear and front wheels 14a, 14b, and a handle 26 that is positioned at the rear of the device 10, relative to the wheels 14a, 14b. A user can grasp the handle 26 to manipulate and move the device 10. The direction from the handle 26 through the mast 16 defines a forward direction for the device 10.

The device 10 also has a lifting mechanism to vertically support the carriage 20 along the mast 16. In this particular embodiment, the lifting mechanism including a winch unit 30 with a winch 32, and a cable 34 that is connected to the winch 32. The lifting mechanism and carriage 20 are substantially similar to those of the devices described and illustrated in International (Patent) Publication No. WO/2018107232 (entitled "Sheet Material Transport and Lifting Device"), filed in the name of Quantum Workhealth Programmes Pty Ltd), the disclosure of which is incorporated herein by reference.

The front of the base 12 includes a pivot section 19 that is pivotally connected to the frame, as shown most clearly in FIG. 4. In this example, the frame includes a front linkage section 40, and a pair of brackets 42 that are connected to the forward linkage section 40. As is shown in FIGS. 1, 2 and 4, the pivot section 19 is pivotally connected to the brackets 42, in this example by a bolt 41, so as to be rotatable about a rotational axis $R_X$. The rotational axis $R_X$ is parallel to the common axis $C_X$, as will be evident from FIGS. 1, 2 and 4.

The pivot section 19 includes a mast step, which in this embodiment is in the form of the sleeve 17, to which the mast is connected, and an arm 28 to which the winch unit 30 is releasably connected, in the manner described and illustrated in WO 2018/107232. By virtue of the pivotable connection of the pivot section 19 to the frame, the mast 16 is rotatable relative to the base 12 about the rotational axis $R_X$.

The device 10 includes an actuator 44 that is operable to change the angular position of the mast 16 relative to the base 12. FIG. 5 shows the device 10 with the mast 16 in its rearmost angular position. In this particular embodiment, when mast 16 in its rearmost angular position, the mast 16 is an angle of approximately 8° to 12° to vertical, as indicated by angle α in FIG. 5. FIG. 6 shows the device 10 with the mast 16 in its forwardmost angular position. In this particular embodiment, when mast 16 in its forwardmost angular position, the mast 16 is an angle of approximately 15° to 20° to vertical, as indicated by angle β in FIG. 6.

In FIGS. 5 and 6, the device 10 is illustrated with a glass pane G supported on the vacuum grips 22. The ability of the device 10 to rotate the mast 16 about the rotational axis $R_X$ as illustrated in FIGS. 5 and 6 contributes to the usability of the device 10 during transport and installation of the pane G. To this end, when the mast 16 is placed in a rearward angular position, the centre of gravity of the pane G is closer to the centre of gravity of the device 10. This has the benefit of contributing to the stability of the device. A prototype example of a device 10 according to this embodiment has been able to lift a glass pane of approximately 350 kg (approximately 770 pounds), which exceeded the weight of the prototype device. Where the weight of the sheet material exceeds the self weight of the device, the stability of the device and sheet material can be compromised.

The actuator 44 is operable to rotate the mast 16 to a forward angular position relative to the base 12 in which the upper end of the mast 16 is forward of the rotational axis $R_X$. In this particular embodiment, the actuator 44 is also operable to rotate the mast 16 to a forward angular position relative to the base 12 in which the upper end of the mast 16 is forward of the front wheels 14b.

In contrast, when the mast 16 is placed in a forward angular position, the centre of gravity of the pane G is comparatively further from the centre of gravity of the device 10. However, in some instances, it is necessary to install a glass sheet in front of the device 10. The ability to position the mast 16 in a forward angular position has the advantage of being able to install sheet material in a generally vertical orientation in front of the front wheels 14b.

In addition, the winch unit 30 of the device 10 can be operated to move the carriage 20, and thus the supporting head 18, in a longitudinal direction with respect to the mast 16, along a traversable portion of the mast 16. In this particular embodiment, the traversable portion of the mast 16 is the portion that is between the sleeve 17, and the mast head bracket 36. This operation of the device 10 is substantially similar to that described and illustrated in detail in WO 2018/107232.

In this particular embodiment, the actuator 44 is able to move the mast 16, and also to retain the mast 16 in a desired position between the forwardmost and rearmost angular positions. Further, the actuator 44 is an electromechanical linear actuator that is powered by a battery of the device 10. As shown in FIGS. 3 and 4, the actuator 44 is connected at a first end to the front linkage section 40, and at the second end to the pivot section 19. In particular, the second end of the actuator 44 is connected to the arm 28. In this way, as the actuator 44 extends, the mast 16 is rotated about the rotational axis $R_X$ towards the forwardmost angular position.

The device 10 has a forward limit stop to limit the angular position of the mast relative to the base to the forwardmost angular position. In this particular embodiment, the forward limit stop is provided by a bolt 46 that extends between the brackets 42 and front of the sleeve 17. As the mast 16 is moved to the forwardmost angular position, the sleeve 17 abuts the bolt 46, which prevents the sleeve 17, and thus the pivot section and mast 16, from progressing further in the forward direction.

The device 10 also has a rearward limit stop to limit the angular position of the mast relative to the base to the rearmost angular position. In this particular embodiment, the rearward limit stop is provided by a shoulder 48 on the outer casing of the actuator 44. As the mast 16 is moved to the rearmost angular position, by the actuator retracting the ram into the outer casing, the arm 28 abuts the shoulder 48, which prevents the arm 28, and thus the pivot section and mast 16, from progressing further in the rearward direction.

In this embodiment, the rear wheels 14a are part of a rear drive unit 50 of the device 10. The rear drive unit 50 includes an outer housing 52, within which the device 10 has electric drive motors (not shown) that are arranged to drive the rear wheels of the device 10, a battery (also not shown) to provide electrical power to the drive motors and the motor of the actuator 44, and an electrical circuit (also not shown)

that interconnects the electrical components of the device 10, including the actuator 44. The rear wheels 14a are arranged to rotate about a rear wheel axis $W_X$.

The rear drive unit 50 has a control panel 54 that has controls with which a user of the device 10 can operate the device 10, and in particular to activate the actuator 44. As shown in the FIGS. 3, 6 and 14, the handle 26 is part of the rear drive unit 50. In this embodiment, the control panel 54 is immediately beneath and in front of the handle 26. The device 10 has control levers (not shown) that are mounted on the handle 26, with which the user operates the drive motors to drive the rear wheels 14a of the device 10 in the forward or reverse direction, as desired.

The rear drive unit 50 includes a set of mounts 38 (shown in FIG. 10). Weights 56 are mountable onto the mounts 38 to provide additional mass to counterbalance sheet material that supported on the supporting head 22. In this embodiment, the mounts 38 are arranged to support the weights 56 in two groups. In this way, the rear drive unit 50 can be evenly weighted over the two rear wheels 14a. In this particular example, there are four weights 56 in each group. Each mount has a weight retaining member (not shown) that inhibits removal of weights 56 from the respective mount. Accordingly, in the event that the device 10 moves across a laterally inclined surface, the likelihood of the weights 56 unintentionally coming off the mounts 38 is reduced.

As will be appreciated, the weight of the rear drive unit 50, together with any weights 56 that are mounted on the rear drive unit 50, provide counterbalance to the weight of sheet material that is supported on the supporting head 18. As will be appreciated, the weight of the sheet material, together with combined weights of the mast 16, supporting head 18, pivot section 19, and lifting mechanism, provide a torque that is centred on the contact of the front wheels 14b with the ground surface. Where that torque acts in a direction to lift the rear wheels 14a, the counterbalance described above acts to stabilize the device 10.

Further, when the mast 16 is in its forwardmost angular position, the carriage 20 is at the top of the traversable portion of the mast 16, and sheet material of a predetermined mass and/or geometry is supported on the supporting head 18, the centre of mass of the device and the predetermined mass is rearward of the front wheel set.

The frame of the device 10 includes a rear linkage section 58 that is interconnected with the front linkage section 40. The front and rear linkage sections 40, 58 together form a linkage of the frame. The length of the linkage (and thus the base 12) is adjustable to alter the wheelbase of the device 10. FIG. 8 shows the device 10 with the base 12 in a contracted configuration, and FIG. 9 shows the device 10 with the base 12 in an extended configuration. As will be appreciated, increasing the length of the wheelbase of the device 10 has the effect of increasing the lever arm of the counterbalancing torque that is provided by the weight of the rear drive unit 50, and weights 56 that are mounted on the rear drive unit 50. Consequently, with the base 12 in the extended configuration, the device 10 is able to carry a heavier load with a reduced likelihood of tipping forward over the front wheels 14b (when compared with the base 12 in the contracted configuration). However, as will be appreciated, the manoeuvrability of the device 10 is reduced with the base 12 in the extended configuration at least because the turning circle radius is increased, when compared with the base 12 in the contracted configuration.

In this particular embodiments, the front and rear linkage sections 40, 58 are hollow square tubes. The rear linkage section 58 is received within front linkage section 40 so as to be in a telescopic arrangement. Both the front and rear linkage sections 40, 58 have transverse holes that align to allow a hitch pin (not shown) to pass through both linkage sections to retain the base 12 in a desired configuration.

The rear drive unit 50 is connected to the rear linkage section 58 by an articulated coupling 60, which is shown in detail in FIG. 10. The coupling 60 enables the rear drive unit 50 to articulate about an articulation axis $A_X$ relative to the base 12. In this way, rotation of the rear drive unit 50 relative to the base 12 and the front wheels 14b enables the device 10 to be steered as it traverses a surface. As will be appreciated, a user can rotate the handle 26 about the articulation axis $A_X$ to rotate the rear drive unit 50 about that axis. FIG. 11 illustrates the device 10 with the rear drive unit 50 rotated about the articulation axis $A_X$ in a direction to cause the device 10 to steer to the right with forward movement. Of course, the device 10 is also able to steer to the left.

As will be observed from the Figures, in this embodiment the articulation axis $A_X$ is transverse to the rotational axis $W_X$ of the rear wheels 14a. Further, the articulation axis $A_X$ of the articulated coupling 60 intersects the rotational axis $W_X$ of the rear wheels 14a.

The frame further has a swivel that enables the articulation axis $A_X$ to rotate relative to the common axis $C_X$ of the front wheels 14b. In this embodiment, the swivel is provided by the interconnection of the articulated coupling 60 to the rear linkage section 58, which is inside the hollow tube of the rear linkage section 58. The swivel allows the rear linkage section 58 to rotate about its long axis relative to the coupling 60. In this way, the swivel allows the rear drive unit 50 to cant relative to the base 12 and mast 16. The long axis of the rear linkage section 58 defines a swivel axis $S_X$ of the device 10.

FIG. 12 shows the rear drive unit 50 in a neutral position relative to the mast 16 and consequently the rotational axes ($C_X$, $W_X$) of the front and rear wheels 14a, 14b are parallel. FIG. 13 shows the rear drive unit 50 in a canted position relative to the mast 16 and consequently the rotational axis $W_X$ of the rear wheels 14a is inclined relative to the rotational axis $C_X$ of the front wheels 14b. Of course, the rear drive unit 50 can also cant in the opposite direction. The ability of the rear drive unit 50 to cant relative to the base 12 and mast 16 contributes to the stability of the device 10 when traversing uneven ground.

The device 10 has swivel limit stops that restrict the rotational range of the swivel. In the illustrated embodiment, the swivel limit stops restrict the rotational range to approximately 10°. As shown most clearly in FIG. 10, the coupling 60 has a fin 62 that projects forwardly into a slot 63a that is formed in the rear end of the rear linkage section 58. The front linkage section 40 also has a slot 63b formed in its rear end, so that when the base 12 is in its fully contracted configuration, the fin 62 projects into both slots 63a, 63b. The side edges of the slots 63a, 63b provide the swivel limit stops, by blocking the fin 62 with rotation of the rear drive unit 58 about the swivel axis $S_X$, and thus limiting the extent of rotation about the swivel axis $S_X$.

In the embodiment of FIGS. 1 to 23, the supporting head 18 has two spaced apart support subassemblies that are interconnected by a cross bar 64. Each support subassembly has a pair of the vacuum grips 22, and a mounting beam 66. Each pair of vacuum grips 22 are mounted on opposing ends of the respective mounting beam 66. The ends of the cross bar 64 are connected to the middle of each of the mounting beams 66.

The device 10 includes a coupling assembly 68 that couples the supporting head 18 to the carriage 20. As shown most clearly in FIGS. 16 to 23, the coupling assembly 68 includes a cross bar mounting portion, which in this embodiment is in the form of a channel 70. The cross bar 64 is connected to the channel 70 by a first connector 72, such that the supporting head 18 is rotatable, relative to the channel 70 and about the first connector 72, between a first position (as shown in FIGS. 17 and 21), and second positions. FIGS. 22 and 23 show the supporting head 18 in a second position.

The device 10 has a second connector 74 that is configured to releasably connect the cross bar 64 to the channel 70. In the example shown in FIGS. 1 to 15, the device 10 has two second connectors 74. The second connectors 74 are spaced from the first connector 72 in the longitudinal direction of the cross bar 64.

FIG. 17 shows the cross bar 64, and thus also the supporting head 18, in the first position relative to the channel 70. When the cross bar 64 is in the first position, the second connectors 74 can be arranged to prevent the cross bar 64 rotating relative to the channel 70 about the first connector 72 and out of the first position.

In this embodiment, each second connector 74 is in the form of a pin that is attached to the channel 70. Each second connector 74 can be moved between an inserted position, in which the shaft of the second connector 74 projects inwardly into the channel 70, and a withdrawn position in which the shaft of the second connector 74 is outside the channel 70. The cross bar 64 has a pin receiving hole 76 for each of the second connector 74. When the cross bar 64 is in the first position and one or both of the second connectors 74 is in the inserted position, the shafts of those second connectors 74 locates in a respective one of the pin receiving holes 76.

As will be appreciated, when the second connectors 74 are arranged such that the shaft of the pin is in the withdrawn position, which enables the supporting head 18 to rotate on the first connector 72 and out of the first position (and thus into second positions). FIGS. 5 and 21 show the supporting head 18 in the first position. FIGS. 6 and 22 show the supporting head 18 in second positions. As will be appreciated, when the second connectors 74 are in the withdrawn positions, the supporting head 18 is able to rotate on the first connector 72. This ability to move out of the first position is of great benefit in installing a glass pane G, as the inclination of the glass plane can be manually altered by the installers.

The coupling assembly 68 includes a pivot coupling 84, and a rotary coupling 86. The pivot coupling 68 enables the cross bar 64, and thus in this embodiment the supporting head 18 itself, to be rotated about a first axis $X_1$ between a first position in which sheet material supported by the supporting head 18 is in a generally transverse orientation forward direction of the device 10, and a second position in which the sheet material supported by the supporting head 18 is in a generally parallel orientation forward direction of the device 10. Further, in this embodiment the pivot coupling 84 enables the cross bar 64 (and also the supporting head 18) to be rotated from the first position, away from the second position, to a third position. In the third position, sheet material supported by the supporting head 18 is oblique to the forward direction of the device 10. In FIGS. 1 to 18, and 21 to 23, the device 10 is shown with the cross beam 24 in the first position. As shown in FIG. 17, the first axis $X_1$ is oblique to the longitudinal direction of the mast 16.

FIG. 19 is a partial view showing the upper mounting beam 66 of the supporting head 18 in the second position relative to the mast 16 and carriage 20. As indicated by angle $R_1$ in FIG. 19, the angular displacement between the first and second positions is approximately 90°. FIG. 20 is a partial view showing the upper mounting beam 66 of the supporting head 18 in the third position relative to the mast 16 and carriage 20. As indicated by angle $R_2$ in FIG. 20, the angular displacement between the first and third positions is approximately 18°.

In this particular embodiment, the carriage 20 includes an inner pivot coupling portion 77, and the supporting head 18 includes an outer pivot coupling portion 78. The inner and outer pivot coupling portions 77, 78 are interconnected by a mounting bolt 80. As shown in FIGS. 17 to 20, the carriage 20 includes a drop pin 81, and the outer pivot coupling portion includes a plate 82. As particularly shown in FIG. 19, the plate 82 has a through hole 83 that aligns with the drop pin 81, when the supporting head 18 is in the first position. When the supporting head 18 is in the first position, the drop pin 81 can extend through the through hole 83 to prevent rotation of the supporting head 18 about the first axis $X_1$. Conversely, the drop pin 81 can be lifted to release the supporting head 18, allowing rotation of the supporting head 18 first axis $X_1$.

As shown in FIGS. 17 to 20, the plate 82 further includes two limit stops 85 that protrude from the plate 82. The limit stops 85 abut the inner pivot coupling 77, thereby limiting rotation of the support head 18 about the first axis $X_1$, relative to the carriage 20, as shown in FIGS. 19 and 20.

The rotary coupling 86 that enables the cross bar 64, and thus in this embodiment the supporting head 18 itself, to be rotated about a second axis $X_2$, which is generally orthogonal to the first axis $X_1$. The rotary coupling 86 allows sheet material supported by the supporting head 18 to be rotated about the second axis $X_2$.

The coupling assembly 68 of this embodiment also includes side shift mechanism 88 that, in this embodiment, is arranged to move the rotary coupling 86, and thus also the channel 70 and supporting head 18, in a direction that is transverse to the longitudinal direction of the mast 16.

The pivot and rotary couplings 84, 86, and side shift mechanism 88 have features similar to those of the devices described and illustrated in International (Patent) Publication No. WO 2015/161349 (entitled "A Device For Lifting And Transporting Sheet Material"), filed in the name of Quantum Workhealth Programmes Pty Ltd, the disclosure of which is incorporated herein by reference.

FIGS. 24 to 31 show a device 110 according to a second embodiment of the present disclosure. The device 110 is intended for use in lifting and transporting sheet material. The device 110 is substantially similar to the device 10 of FIG. 1, and like components of the device 110 have the same reference numeral with the prefix "1".

As will be observed from FIG. 24, the device 110 has a supporting head 118 that has two vacuum grips 122 that are attached at opposing ends of a cross bar 124. When compared with the device 10 of the first described embodiment, the device 110 has a lighter lifting capacity, and does not include drive motors to rotate the wheels 114a, 114b. Accordingly, a user of the device must use manual effort to move the device 110.

The rear linkage section 158 of the device 110 includes a steerer head 190 that is connected to the rear end of the rear linkage section 158. Further, the device 110 has a steerer tube 192 that extends through the steerer head 190, and is connected at a lower end to an axle housing 194. The upper end of the steerer tube 192 projects upwardly of the steerer head 190, and a stem 196 is secured to the upper end of the steerer tube 192. The handle 126 is connected to the outer end of the stem 196.

A transverse axle passes through the axle housing 194, and a pair of rear wheels 114a are mounted on the transverse axle so as to rotate about a rear wheel axis $W_X$.

In this example, the handle 126, stem 196, steering tube 192, axle housing 194, transverse axle and rear wheels 114a together form a steering assembly of the device.

As shown in FIG. 31, the rear linkage section 158 of the device 110 further includes four weight mounts 138, which in this embodiment extend laterally from the steerer head 190. Weights 156 are mountable onto the mounts 138 to provide a counterbalance to the weight of sheet material that is supported on the supporting head 122. In this embodiment, the mounts 138 are arranged to support the weights 56 in two groups. In this way, the weights 156 can be evenly dispersed over the two rear wheels 14a.

Each mount 138 has a weight retaining member (not shown) that inhibits removal of weights 156 from the respective mount 138. In this embodiment, the weight retaining members have a shaft within an external screw thread that is received in internally threaded holes 139 on the outer end of each mount 138. Once installed on the mounts 138, the weight retaining members block the weights 156 from sliding off the mounts 138. Accordingly, in the event that the device 110 moves across a laterally inclined surface, the likelihood of the weights 156 unintentionally coming off the mounts 138 is reduced.

As shown in FIGS. 29 to 31, each weight 156 has a slot that opens to a rear edge of that weight 156. The weights 156 are loaded onto the mounts 138 with the slots oriented towards the rear of the device 110. As shown in FIG. 30, as the steering assembly rotates about the articulation axis $A_X$, the stem 196 moves into the aligned slots of those weights 156 that are on the corresponding side of the device 110. As will be appreciated, in this particular embodiment it is advantageous for the mass of the weights 156 to be fixed relative to the base 112, and rotationally decoupled from the steering assembly.

In this embodiment, the actuator 144 is a mechanical actuator, which in this example has a screw shaft 195, a fixed nut 197 through which the screw shaft 195 extends, and a drive input 199 that is rotationally fixed to the screw shaft 195.

The base 112 includes a post 198 that is attached to the front linkage section 140. The fixed nut 197 of the actuator 144 connected to the post 198. A user can rotate the drive input 199 to cause the screw shaft 195 to rotate, and thus extend or contract the actuator 144. In turn, the change of length of the actuator 144 causes the pivot section 119, and thus also the mast 116, to rotate about the rotational axis $R_X$.

In this particular embodiment, the drive input 199 is a socket to which a tool, such as a cordless drill with a mating socket, is attachable. When desired, the user can attach the mating socket to the drive input 199 and operate the drill to rotate the screw shaft 195.

In the embodiment of FIGS. 24 to 31, the device 10 has a rear unit that is formed of the front and rear linkage sections 40, 58, and the steering assembly. Advantageously, the device 110 can be disassembled, including to disconnect the rear unit from the pivot section 119.

Similarly with the device 10 of the first described embodiment, the length of the linkage (and thus the base 112) in this embodiment is also adjustable to alter the wheelbase of the device 110. FIGS. 25 and 26 show the device 110 with the base 112 in a contracted configuration, and FIGS. 26 and 28 shows the device 110 with the base 112 in an extended configuration.

In this particular example, the front end of the rear linkage section 158 provides a rear limit stop so as to limit the angular position of the mast 116, and thus also the pivot section 119, relative to the base 112 to a first rearmost angular position, when the base 112 is in the contracted configuration. In FIG. 26, the rearmost angular position is indicated by angle $\alpha_1$.

With the base 112 in the extended configuration, the rear linkage section 158 is spaced from the pivot section 119. Accordingly, in this configuration the mast 116, and thus also the pivot section 119, is able to rotate further about the rotational axis $R_X$ towards the rear of the device 110, beyond the first rearmost angular position.

The device 110 also has a rearward limit stop to limit the angular position of the mast 116 relative to the base 112 to a second rearmost angular position. In this particular embodiment, the rearward limit stop is provided by a shoulder 148 on the outer casing of the actuator 44. As the mast 16 is moved to the second rearmost angular position, by the actuator retracting the outer case over the screw shaft 195, the shoulder 48 abuts the post 195, which limits the extent to which the pivot section 119 and mast 116 can rotate in the rearward direction about the rotational axis $R_X$. In FIG. 28, the second rearmost angular position is indicated by angle $\alpha_2$. As will be observed by comparing FIGS. 26 and 28, the angle between the second rear most angular position and a vertical plane is greater than the angle between the first rear most angular position and a vertical plane. In other words, $\alpha_2 > \alpha_1$.

FIGS. 24 to 31 show a device 210 according to a third embodiment of the present disclosure. The device 210 is intended for use in lifting and transporting sheet material. The device 210 is substantially similar to the device 110 of FIG. 24, and like components of the device 210 have the same reference numeral with the prefix "2" replacing the prefix "1".

The principle difference is that the device 210 includes a propping leg 280 that is connected to the frame of the base 212 by a bracket 282. The propping leg 280 can be pivoted on the bracket 282 between a raised position, as shown in FIGS. 32, 33 and 35, and a lowered position, shown in FIG. 34. When the propping leg 280 is in the lowered position and against a ground surface, the propping leg 280 stops the device 210 from inadvertently moving across that surface.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A device for use in lifting, transporting and installing sheet material, the device comprising:
   a base comprising a frame;
   wheels on which the base is supported, such that the base is movable across a surface on the wheels, the wheels including:
      one or more rear wheels that are connected to the rear of the base in a manner that permits steering of the device during movement across the surface, and
      a front wheel set that is connected to the front of the base, the front wheel set including a wheel to each side of the device, the wheels of the front wheel set being rotatable about a common axis;
   a mast that extends upwardly from the base, and is connected to the base such that the mast is rotatable relative to the base about a rotational axis, the rotational axis being parallel to the common axis;
   a pivot section that is pivotally connected to the frame, the pivot section including a mast step to which the mast is connected;
   at least one axle on which the front wheels are mounted, the at least one axle connecting the front wheels to the pivot section so that the common axis is rotatable so as to rotate with the mast about the rotational axis;
   a carriage that is in engagement with the mast so that carriage is movable along at least a traversable portion of the mast and is guided by the mast;
   a supporting head that is mounted to the carriage, and is configured to support sheet material above the surface;
   a lifting mechanism to provide support to the carriage in the longitudinal direction of the mast; and
   a linear actuator that is connected at one end to the frame and at the opposing end to the pivot section, and that is operable to change the angular position of the mast relative to the base.

2. A device according to claim 1, wherein the actuator is operable to rotate the mast to a forward angular position relative to the base in which the upper end of the mast is forward of the rotational axis.

3. A device according to claim 1, wherein the actuator is operable to rotate the mast to a forward angular position relative to the base in which the upper end of the mast is forward of the front wheels.

4. A device according to claim 3, further comprising a forward limit stop to limit the angular position of the mast relative to the base to the forwardmost angular position.

5. A device according to claim 1, wherein the actuator is operable to rotate the mast to a rearward angular position relative to the base in which the upper end of the mast is rearward of the rotational axis.

6. A device according to claim 5, further comprising a rearward limit stop to limit the angular position of the mast relative to the base to the rearmost angular position.

7. A device according to claim 1, further comprising one or more mounts at the rear of the device, whereby weights are mountable onto the mounts to provide additional mass to counterbalance sheet material that is supported on the supporting head.

8. A device according to claim 1, further comprising one or more drive motors that are arranged to drive at least one wheel of the device.

9. A device according to claim 8, further comprising a battery to provide electrical power to the drive motors, and a housing in the rear portion of the device, wherein the battery, drive motors and an electrical circuit that interconnects the battery and drive motors are contained within the housing, and wherein the actuator is an electromechanical actuator that is powered by the battery.

10. A device for use in lifting, transporting and installing sheet material, the device comprising:
    a base comprising a frame;
    wheels on which the base is supported, such that the base is movable across a surface on the wheels, the wheels including:
       one or more rear wheels that are connected to the rear of the base in a manner that permits steering of the device during movement across the surface, and
       a front wheel set that is connected to the front of the base, the front wheel set including a wheel to each side of the device, the wheels of the front wheel set being rotatable about a common axis;
    a front portion that includes the front wheel set and the front of the base, and a rear portion that includes the rear wheels and the rear of the base;
    the frame including a linkage that extends between the front and rear portions of the device, whereby the length of the linkage is adjustable to thereby adjust the wheelbase of the device;
    a mast that extends upwardly from the base, and is connected to the base such that the mast is rotatable relative to the base about a rotational axis, the rotational axis being parallel to the common axis;
    a carriage that is in engagement with the mast so that carriage is movable along at least a traversable portion of the mast and is guided by the mast;
    a supporting head that is mounted to the carriage, and is configured to support sheet material above the surface;
    a lifting mechanism to provide support to the carriage in the longitudinal direction of the mast; and
    an actuator that is operable to change the angular position of the mast relative to the base.

11. A device according to claim 10, wherein the frame further comprises a swivel that enables the articulation axis to rotate relative to the common axis of the front wheels.

12. A device according to claim 11, wherein the base includes a pivot section that is pivotally connected to the frame, the pivot section including a mast step to which the mast is connected, and wherein the actuator is a linear actuator that is connected at one end to the frame, and at the opposing end to the pivot section.

13. A device according to claim 12, further comprising an articulated coupling between the front and rear wheels that enables the rotational axis of the rear wheels to rotate within a general horizontal plane and about an articulation axis relative to the front wheels to thereby steer the device.

14. A device according to claim 13, wherein the articulation axis of the articulated coupling intersects the rotational axis of the rear wheels.

15. A device according to claim 12, wherein the actuator includes a screw shaft that is rotatable to rotate the mast, a fixed nut that is connected to the base, and a drive input that is rotationally fixed to the screw shaft, whereby a user can rotate the drive input to cause the threaded shaft to rotate.

16. A device according to claim 12, wherein the supporting head has two spaced apart support subassemblies that are interconnected by a cross bar; and the device further comprises a coupling assembly that couples the supporting head to the carriage, wherein the coupling assembly includes a cross bar mounting portion, and two spaced apart connectors that include a first connector and a second connector, wherein the first connector connects the cross bar to the cross bar mounting portion such that the cross bar is rotatable about the first connector between a first position and one or more second positions, and wherein the second connector is configured to releasably connect the cross bar to the cross bar mounting portion, whereby, when the supporting head is in the first position relative to the cross bar mounting portion, the second connector can be arranged to prevent the cross bar rotating about the first connector out of the first position.

17. A device for use in lifting, transporting and installing sheet material, the device comprising:

a base;

wheels on which the base is supported, such that the base is movable across a surface on the wheels, the wheels including:

one or more rear wheels that are connected to the rear of the base in a manner that permits steering of the device during movement across the surface, and a front wheel set that is connected to the front of the base, the front wheel set including a wheel to each side of the device, the wheels of the front wheel set being rotatable about a common axis; a mast that extends upwardly from the base; a carriage that is in engagement with the mast so that carriage is movable along at least a traversable portion of the mast and is guided by the mast;

a lifting mechanism to provide support to the carriage in the longitudinal direction of the mast;

a supporting head that is configured to support sheet material above the surface, the supporting head has two spaced apart support subassemblies that are interconnected by a cross bar;

a coupling assembly that couples the supporting head to the carriage, the coupling assembly having a cross bar mounting portion, and two spaced apart connectors that include a first connector and a second connector, wherein the first connector connects the cross bar to the cross bar mounting portion such that the supporting head is rotatable about the first connector between a first position and one or more second positions, and wherein the second connector is configured to releasably connect the cross bar to the cross bar mounting portion, whereby, when the supporting head is in the first position relative to the cross bar mounting portion, the second connector can be arranged to prevent the cross bar rotating about the first connector out of the first position.

18. A device according to claim 17, wherein the second connector includes one or more spring-biased pins that are mounted on the cross bar mounting portion, and are arranged with a shaft that is to project through aligned apertures in the cross bar and cross bar mounting portion when the supporting head is in the first position.

* * * * *